US008687396B2

(12) United States Patent
Fratta

(10) Patent No.: US 8,687,396 B2
(45) Date of Patent: Apr. 1, 2014

(54) STATIC CONVERSION METHOD AND SYSTEM FOR THE REGULATION OF POWER IN AN ALTERNATING CURRENT ELECTRICAL NETWORK

(75) Inventor: Antonino Fratta, Turin (IT)

(73) Assignee: ET99 S.r.L., Turin (IT)

( * ) Notice: Subject to any disclaimer, the term of this patent is extended or adjusted under 35 U.S.C. 154(b) by 320 days.

(21) Appl. No.: 13/266,696

(22) PCT Filed: May 6, 2010

(86) PCT No.: PCT/IB2010/052002
§ 371 (c)(1),
(2), (4) Date: Oct. 27, 2011

(87) PCT Pub. No.: WO2010/128477
PCT Pub. Date: Nov. 11, 2010

(65) Prior Publication Data
US 2012/0057378 A1    Mar. 8, 2012

(30) Foreign Application Priority Data
May 8, 2009    (IT) .............................. TO2009A0367

(51) Int. Cl.
*H02M 7/521*    (2006.01)
(52) U.S. Cl.
USPC .......................................... 363/137; 363/131
(58) Field of Classification Search
USPC ........................... 363/131–132, 135–138, 71
See application file for complete search history.

(56) References Cited

FOREIGN PATENT DOCUMENTS

| WO | 03/041248 A2 | 5/2003 |
| WO | 2007/025946 A1 | 3/2007 |

OTHER PUBLICATIONS

A. Fratta, et al., "Minimum Capacitor Size in DC/DC/AC Converters by means of Novel PWM Technique and DC-Link Structure.". Industrial Electronics, Proceedings of the 2002 IEEE International Symposium, Jul. 8, 2002, pp. 789-794, vol. 3.
A. Fratta, et al., "DC-AC Conversion Strategy optimized for Battery or Fuel-Cell-Supplied AC Motor Drives", Industrial Electronics, Proceedings of the 2000 IEEE International Symposium, Dec. 4, 2000, pp. 230-235, vol. 1.

*Primary Examiner* — Harry Behm
*Assistant Examiner* — Matthew Grubb
(74) *Attorney, Agent, or Firm* — Sughrue Mion, PLLC

(57) ABSTRACT

The method can be used for the regulation of power in an alternating current electrical network (ACNW; ACNW1, ACNW2), using a conversion system (PCS) having at least two terminals (1,2; 1,2,3; 1,2,3,N) for connection to the network, wherein each of said terminals has a corresponding electrical potential. Each of the potentials of these terminals has an upper and a lower envelope, the difference between which, or envelope voltage ($V_{EP,EN}$), is a variable positive continuous quantity having a maximum value ($V_{EA}$) called the envelope amplitude.
The method comprises the operations of:
  defining at least an upper range (ER) of voltage values, comprising said maximum value or envelope amplitude ($V_{EA}$) and having a width ($V_E$; $V_{EE}$) which is substantially smaller than the envelope amplitude ($V_{EA}$);
  using a structure (PCS) including at least a first static converter (ES) capable of regulating the electrical power by the regulation of the envelope voltage ($V_E$; $V_{EE}$) in the aforesaid upper range (ER);
  this upper range (ER) having a width determined in such a way that the at least one static converter (ES) regulates more than one half of the mean active electrical power exchanged with the network (ACNW; ACNW1, ACNW2).

21 Claims, 22 Drawing Sheets

Elementary symmetrical structure of three-phase ET/AC inverter stage.

Schematic diagram of a single-phase ET/AC inverter, with E and T converters supplied in corresponding ranges of DC voltage Envelope voltage of a regular symmetrical set of three sinusoids formed by the three components; potentials of the three phases and of neutral with respect to the negative envelope potential.

Schematic diagram of a three-phase ET/AC inverter stage

Elementary symmetrical structure of three-phase ET/AC inverter stage.

Three-phase stage for direct transition to the AC network and filtered EE/AC connection array for envelope converters which regulate only above an AC amplitude value below the nominal level Three-phase inverter incorporating three transition converters (MOSFET HV) and the EE/AC connection array (with "low-sat" IGBTs) driven by a MOSFET envelope converter

FIG. 13

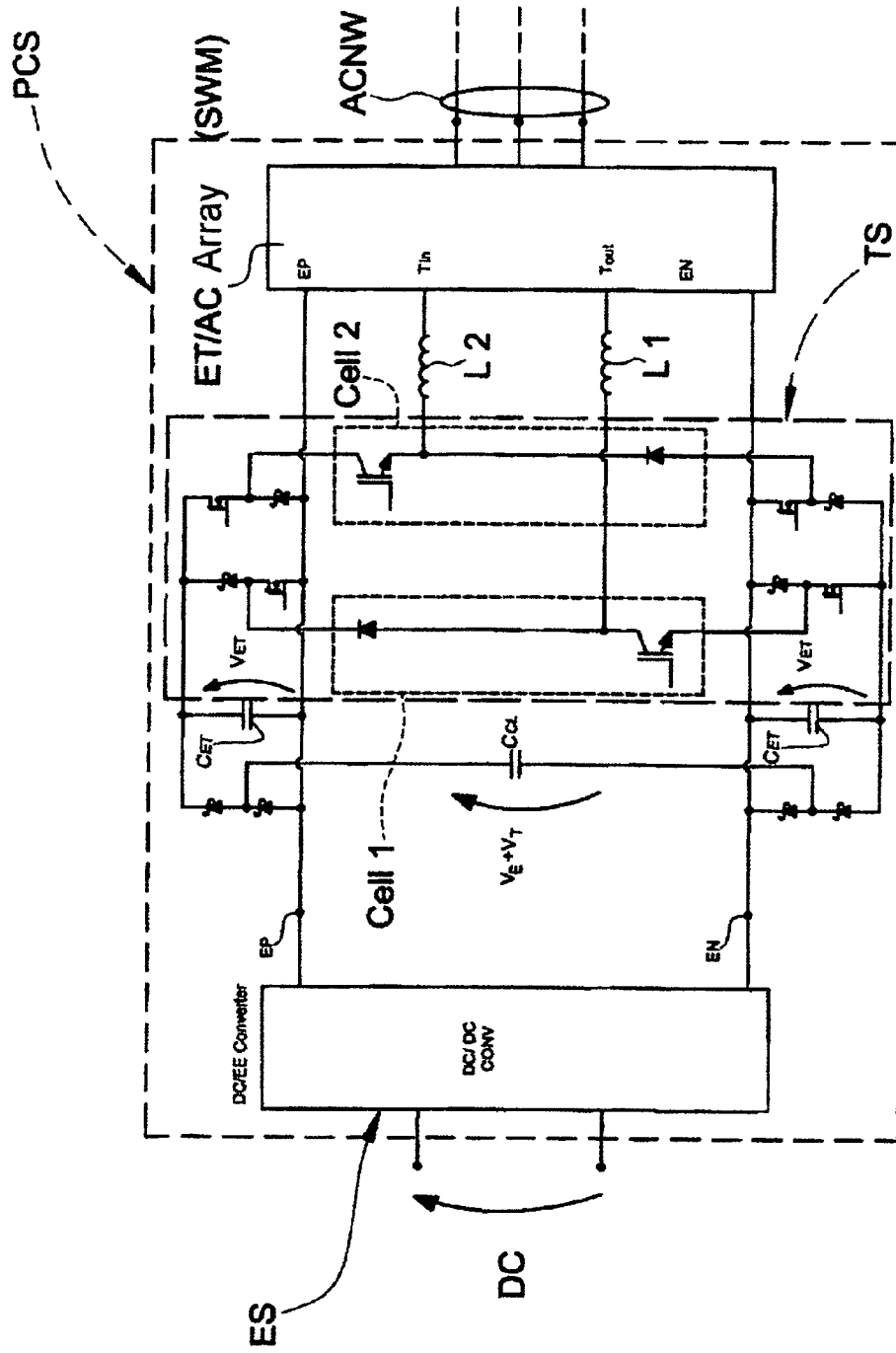

Direct DC/AC active power conversion using a DC link for envelope voltage (EE link) which autonomously generates at diodes the canonical ET voltages on the clamp capacitors CCL and overlap capacitors CET, for the supply and extension of the transition conversion in ET overlap, in the version with two unidirectional converters, ET/AC array output with integrated filter snubbers according to Fig. 12

Direct DC/AC active power conversion using a DC link for envelope voltage (EE link) according to Fig. 13; the diode network is replaced by two low-voltage MOSFET cells for the active control of the current errors in the EE link and of the voltage at the capacitors, by means of PWM regulation of current in the inductance in series with the clamp capacitor CCL ET/AC conversion with transition converter composed of generalized level switch with steps of ΔV, in cascade with a PWM incremental converter, with a regulation range of [± ½(VET+ΔV)] for the ET overlap.

Elementary design with single transformer and unidirectional secondary current of the transition conversion for providing completely FC-less conversion.

Multi-level AC/ET/AC conversion in transition with minimum splitting $VT = 2 \Delta V$; benefits from the special properties for the design of the transformers required for the FC-less implementation of PWM ET+$\Delta$ conversion in cascade; allows the construction of T-$\Delta$ level switches with simple cells or inverter legs.

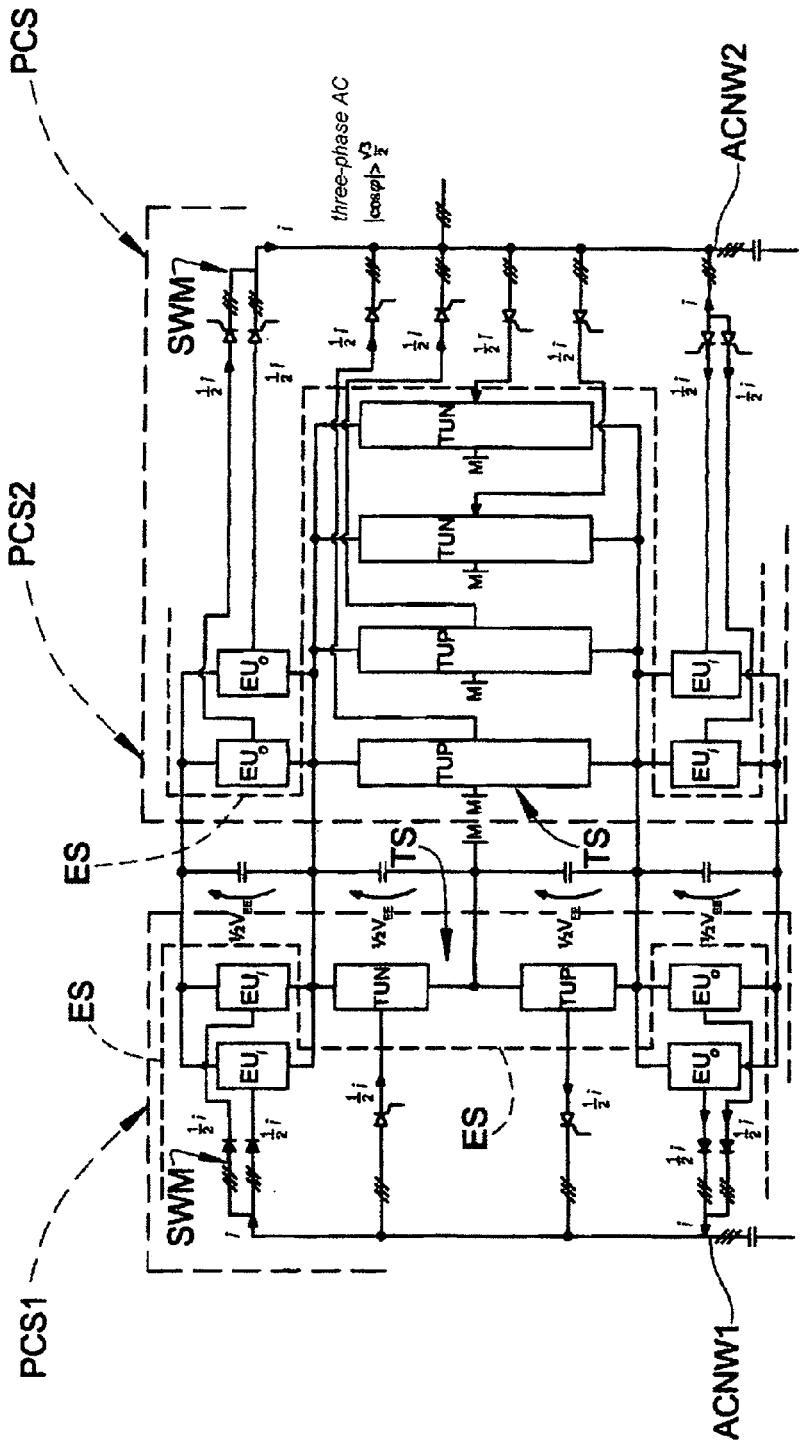

FIG. 19

Specific AC/ET/AC conversion system with power flow in a defined direction and current modularity equal to approximately half of the amplitude of the AC line currents; $\cos\varphi = 1$ at the input and compatible specialization of the unidirectional regulation ranges; $|\cos\varphi| > 0.866$ at the output and construction with double transition modules and correlated availability of voltage regulation from zero for starting electrical machines.

An important case of complete AC/ET/AC FC-less homopolar conversion with DC link divided into 7 equal parts and PWM power converters, all supplied at the same voltage $V_{EE}$ by the non-symmetrical ET link structure.

ESTW circuit for the IGBT power transistors for PWM transition regulation; when the IGBT is ON, the MOSFET-Schottky cell regulates the voltage $V_{ET}$ as the ET overlap regulation range; when the IGBT is OFF, the MOSFET-Schottky cell regulates the supply to the common driver ETDR.

FIG. 22

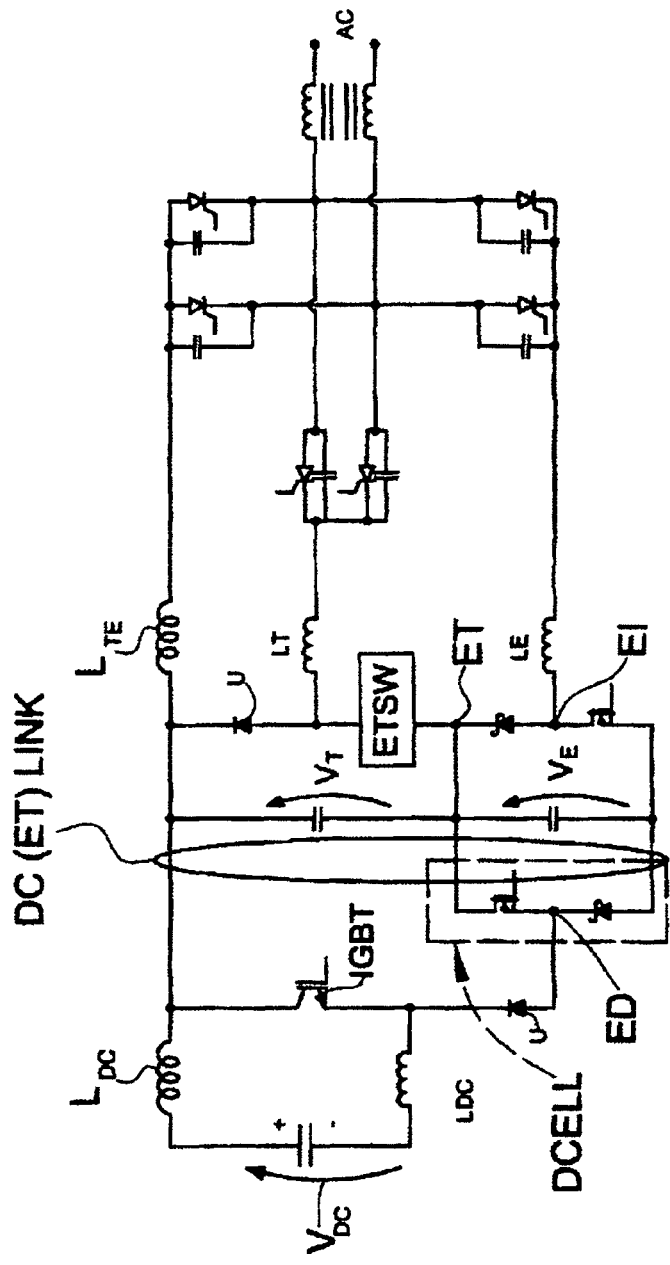

DC/ET/AC circuit for generation in a single-phase AC network from a variable DC source; high compatibility with filters integrated as snubbers of the thyristors of the ET/AC array; natural switching of the thyristors regulated in ET overlap using ETSW; operation with independent DC/ET and ET/AC regulation; possibility of quasi-direct conversion by connecting the common terminals of the two MOSFET cells.

STATIC CONVERSION METHOD AND SYSTEM FOR THE REGULATION OF POWER IN AN ALTERNATING CURRENT ELECTRICAL NETWORK

CROSS REFERENCE TO RELATED APPLICATIONS

This application is a National Stage of International Application No. PCT/IB2010/052002 filed May 6, 2010, claiming priority based on Italian Patent Application No. TO2009A000367 filed May 8, 2009, the contents of all of which are incorporated herein by reference in their entirety.

The present invention relates to a method for regulating the power in an alternating current electrical network using a static conversion system.

TECHNICAL BACKGROUND OF THE INVENTION

The international community is devoting increasing resources to innovation in medium and high power static conversion, up to medium voltage levels, in response to the potential of new applications such as energy generation from renewables and the increasing requirement for improved conversion and compatibility in conventional applications such as the supply of electric motors in existing installations.

The common factor in all these activities can be summarized as the application of the regulating properties of PWM (Pulse Width Modulation), made possible by forced switching, replacing the more limited properties of natural switching of the controlled diode type, while providing a radical solution to the problems of compatibility and efficiency posed by the prior art PWM structures.

Specifically, the prior art of 'two-level' forced switching is represented by simple circuit structures in which the electrical quantities are generated and regulated by pulses at two values or levels which delimit the range of regulation. Forced switching between these extreme values or levels produces a quantity of dissipated energy which, at the high switching frequency required by PWM methods, has a dominant effect in energy terms on the overall efficiency.

The reduction of the switching times, and therefore of energy losses, is not achievable because of the dynamic limits of the semiconductors or physical layout limitations, leading to the emission of electromagnetic interference which makes a converter incompatible unless it is provided with complex partially dissipating filters to ensure electromagnetic compatibility, which would make the converter bulky.

The compromise between switching performance and electromagnetic compatibility, which is fundamental for the widespread adoption of industrial electrical drives, is also based on the opportunity of using new electrical machines, or conventional machines redesigned on an ad hoc basis, which can withstand the dynamic stresses of switching in order to exploit the inductive reactive properties as a functional part of the conversion.

In this context, it is evident that generation applications in an electrical network cannot be equated to industrial drive applications. For generation applications, it is necessary to attenuate the discontinuities of PWM switching before they reach the converted electrical circuit, by providing filters (or reactive dipole filters) which have a major effect on the volume, weight, efficiency and cost of a complete PWM converter.

PRIOR ART

At the present time, most international research appears to be devoted to the demonstration of the functions of new and more complex conversion structures, having in common what is called the "multi-level" approach, which can provide multiple different instantaneous voltage levels between the extreme values required by the application. This multiplicity of levels is achieved by the serial connection of multiple elementary substructures which can switch amplitudes which are a fraction of the total range of values. The multiphase composition of these elementary substructures also gives rise to the distinctive properties and redundancies of the resulting vector components.

The term "multi-level" summarizes the difference between these systems and the "two-level" prior art.

Multi-level splitting increases the resolution and makes it possible to reduce the amplitude of the individual discontinuities required for mean value regulation over the whole specified range of regulation. The reduction of the individual discontinuities reduces switching losses and improves compatibility; in other words it requires (reactive) filters which are cheaper in proportion to the amplitude of the individual discontinuities.

However, this multi-level multiplicity is achieved by means of a series of multiple switches, which greatly increase the losses in the semiconductors due to the conduction of the same current component.

However, multi-level structures may also be indispensable, for example in medium-voltage applications where it would be either inconvenient or impossible to produce elementary switches to withstand the full voltage. In this sense, the development of multi-level structures is following a route imposed by necessity, which is used to justify a degree of complexity, cost, and operational instability which would otherwise be considered unacceptable. Some of these drawbacks which are related to the cascaded substructures may be mentioned here:

- multiple independent power supplies, which are costly and difficult to design because of the highly discontinuous operation of each substructure;
- "floating" substructures require a galvanically insulated power supply of the transformer type;
- a regenerative power supply, forming an alternative to the considerable overdimensioning of a bank of capacitors, and capable of storing and supplying peaks of power to enable the power supplies to be designed for a suitable mean power level.

In conclusion, multi-level conversion requires a multiplicity of transformer power supplies and/or energy stores in flying capacitor banks, the numbers of these devices increasing with the number of levels.

In view of the requirements and costs of each substructure and the need to protect the whole conversion system from failure or individual loss of service, the weight of the "power supplies" explains the limited take-up of multi-level conversion, as opposed to the expectations raised by the reduction in cost of the input and output filters.

However, the problem of competitiveness of multi-level converters is demonstrated in a more straightforward way by the increase in power losses due to conduction, which is correlated with the number of components in series or of cascaded structures which have to conduct the same current in order to provide multi-level performance.

BRIEF DESCRIPTION OF THE INVENTION

One object of the present invention is to propose an innovative approach to static conversion, based on the recognition of the properties of components which are characteristic of alternating electrical quantities, in support of which the conversion structures implicitly having "multi-level" performance are defined as being of the single type because they are specific to the converted AC system.

A further object is to propose an approach to static conversion which requires circuit structures which are highly simplified, economical and highly efficient because of the smaller number of cascaded components or structures with respect to the degree of resolution of the multi-level regulation.

These and other objects are achieved according to the invention by means of a method for the regulation of power in an alternating current electrical network using a conversion system having at least two for connection to the network, wherein terminals, in which each of said terminals has a corresponding electrical potential.

Each of the potentials of said terminals has an upper and a lower envelope, the difference between which, called the "envelope voltage", is a variable positive continuous quantity having a maximum value called the "envelope amplitude".

The method comprises the operations of:
defining at least an upper range of voltage values, or envelope range, comprising said maximum value or envelope amplitude and having a width which is substantially smaller than the envelope amplitude;
using a structure including at least a first static converter capable of regulating electrical power by the regulation of the envelope voltage in the aforesaid upper range;
said upper range having a width determined in such a way that said at least one static converter regulates more than one half of the mean active electrical power exchanged with the network.

DEFINITIONS AND FEATURES OF THE INVENTION

The invention enables new conversion properties to be obtained by distinguishing between the energy effects and the properties of values characteristic of AC quantities.

The invention provides for the use of a power conversion system which is variable about a specified continuous mean value, which can be correctly coupled to a DC network, in relation to which it operates as an inverter to regulate the power in the AC network. The resulting structure is therefore of the DC/AC type. The range of values of potential on the DC side which is necessary for regulation towards the connections to the AC network corresponds to the difference between the upper and lower envelope potentials of all the electrical potentials of the terminals for connection to the AC network, this difference being called the envelope voltage.

The envelope voltage is generally a variable, which is positive by definition, whose maximum value is called the envelope amplitude, or more simply the amplitude, this variable being the dominant variable in respect of the design of the conversion system as a whole.

In an elementary embodiment of the invention, the envelope amplitude is divided into two ranges of values, one of which is called the "upper range" or "envelope range" or "type E range", while the other is called the "lower range" or "transition range" or "type T range".

This distribution or division, referred to hereafter as the "ET" division, in its various configurations, has corresponding dedicated conversion substructures, each specifically designed for type E or type T components, so that conversion structures made according to the present invention can generally be referred to as "DC/ETAC", referring to the E and T components of the AC quantities.

DESCRIPTION OF THE DRAWINGS

Further features and advantages of the invention will be made clear by the following detailed description, provided purely by way of non-limiting example, with reference to the appended drawings, in which:

FIG. 13 is a diagram of a direct DC/AC active power converter using an envelope voltage DC link;

FIG. 19 is a diagram showing AC/ET/AC conversion with a power flow in a specified direction and with current modularity equal to about half the amplitude of the alternating line currents;

FIG. 22 shows the circuit of a DC/ET/AC conversion unit for generation in a single-phase AC network from a DC voltage source.

DETAILED DESCRIPTION OF EMBODIMENTS

Identification of the Higher Power Component E of an AC Quantity

The example of an AC voltage in any multi-phase network, present between two terminals of the network connected to a converter which has to regulate it, will be considered.

It can be demonstrated that, in all cases, most of the active power in any single period is converted for values close to the values of maximum and minimum amplitude of the waveform of this voltage, in other words values close to the maximum value of the modulus of the voltage, while the remainder of the voltage waveform defines the passage or transition modalities between the sub-intervals of the AC period in which the active power conversion takes place to a greater extent.

Figure 1:
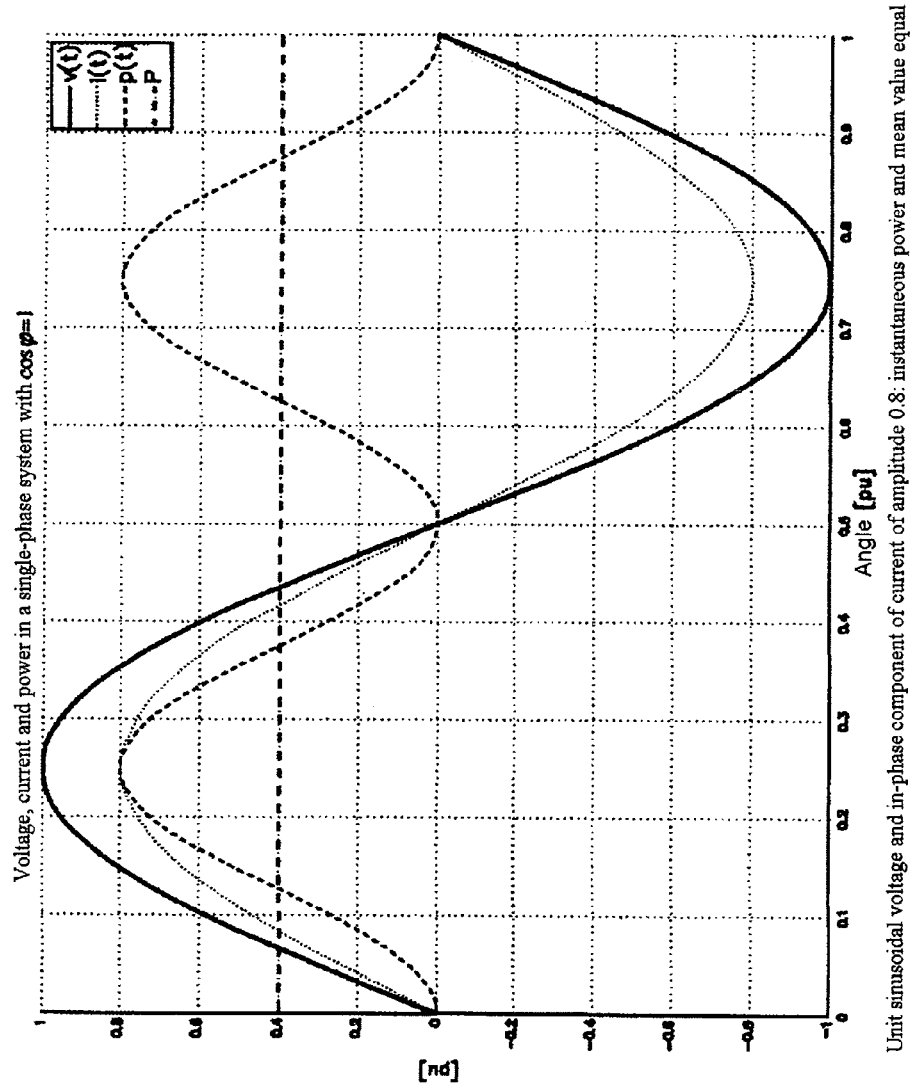
FIG. 1 is a diagram showing the variations of voltage, current and power as a function of an angular coordinate shown on the horizontal axis in a single-phase system with $\cos \phi = 1$.

By way of a typical example, the sinusoidal alternating waveforms of FIG. 1 represent a voltage $v(t) = \hat{V} \sin(2\pi t/T_{AC})$ of unit amplitude $\hat{V}$ (where $T_{AC}$ is the period) and the proportional current component $i(t)$, having an amplitude $\hat{I}=0.8$ for the purposes of illustration.

The instantaneous power $p(t)$, the product of the two waveforms $v(t)$ and $i(t)$, is a second harmonic cosinusoid which is cancelled twice in the period of $v(t)$ and $i(t)$ and has a mean value $P=0.4$, equal to half of the peak power which is 0.8 in the case of FIG. 1. The mean power $P$ is invariant in the presence of any other component of the current $i(t)$ which is not proportional to the voltage $v(t)$.

By integral calculus it can be demonstrated that:
- 82% of the active power is produced in the quarters of the period in which $|v(t)| > 0.707 \hat{V}$;
- 65% of the active power is produced in the sixths of the period in which $|v(t)| > 0.866 \hat{V}$.

In other words, the present invention is based on the recognition that voltage regulation in the range from $0.707 \hat{V}$ to $1.00 \hat{V}$ (that is to say, in a range equal to less than 30% of the amplitude $\hat{V}$) makes it possible to regulate what is clearly a majority proportion (82%!) of the active power; similarly, voltage regulation in the range from $0.866 \hat{V}$ to $1.00 \hat{V}$ (that is to say, in a range equal to less than 15% of the amplitude $\hat{V}$) makes it possible to regulate a proportion of the active power which is still preponderant (65%!).

With reference to the definition of the invention provided in claim 1, in the numerical examples considered above, either the range $[0.707:1]\hat{V}$ or the range $[0.866:1]\hat{V}$ can be used as the upper range or envelope range.

Figure 2:
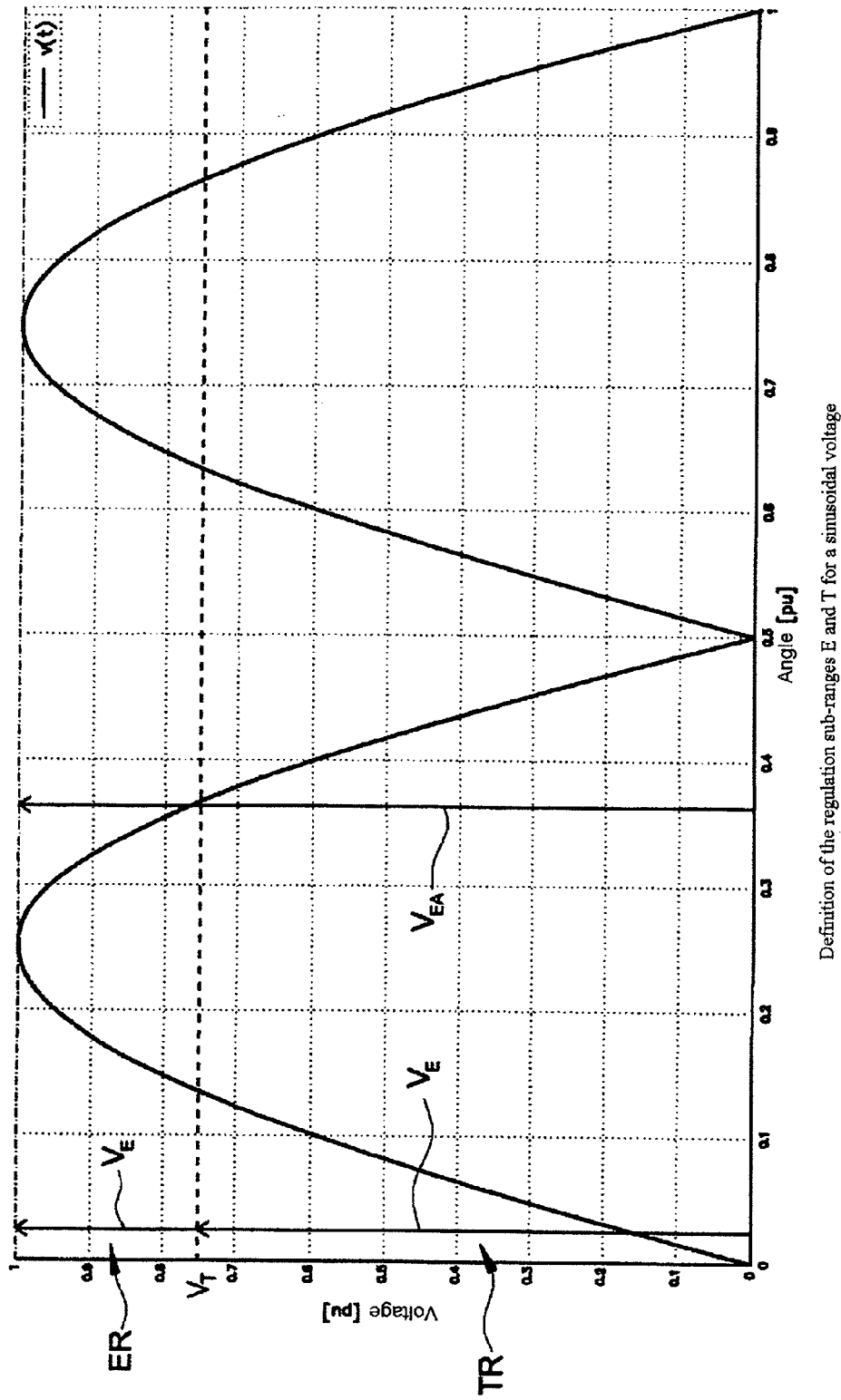
FIG. 2 is a diagram showing a division of the range of variation of the envelope voltage of a sinusoidal voltage into regulation sub-ranges of the E and T types.

With reference to the sinusoidal case of a single-phase network with two connections, FIG. 2 shows an example of ET (envelope-transition) division of the envelope voltage, in this case coinciding with the modulus of the single AC voltage, into a sub-interval of transition values from zero to $V_T$ which forms the sub-range of transition regulation "TR", equal for example to 75% of the amplitude shown in the drawing, and into another sub-interval of values, lying between $V_T$ and the amplitude $V_{EA}$, or envelope amplitude, which forms the sub-range of regulation "ER" of the maximum values of the envelope voltage, with a width of $V_E = V_{EA} - V_T$.

Elementary Theoretical Case: ET/AC Single-Phase Inverter Stage

Figure 3:
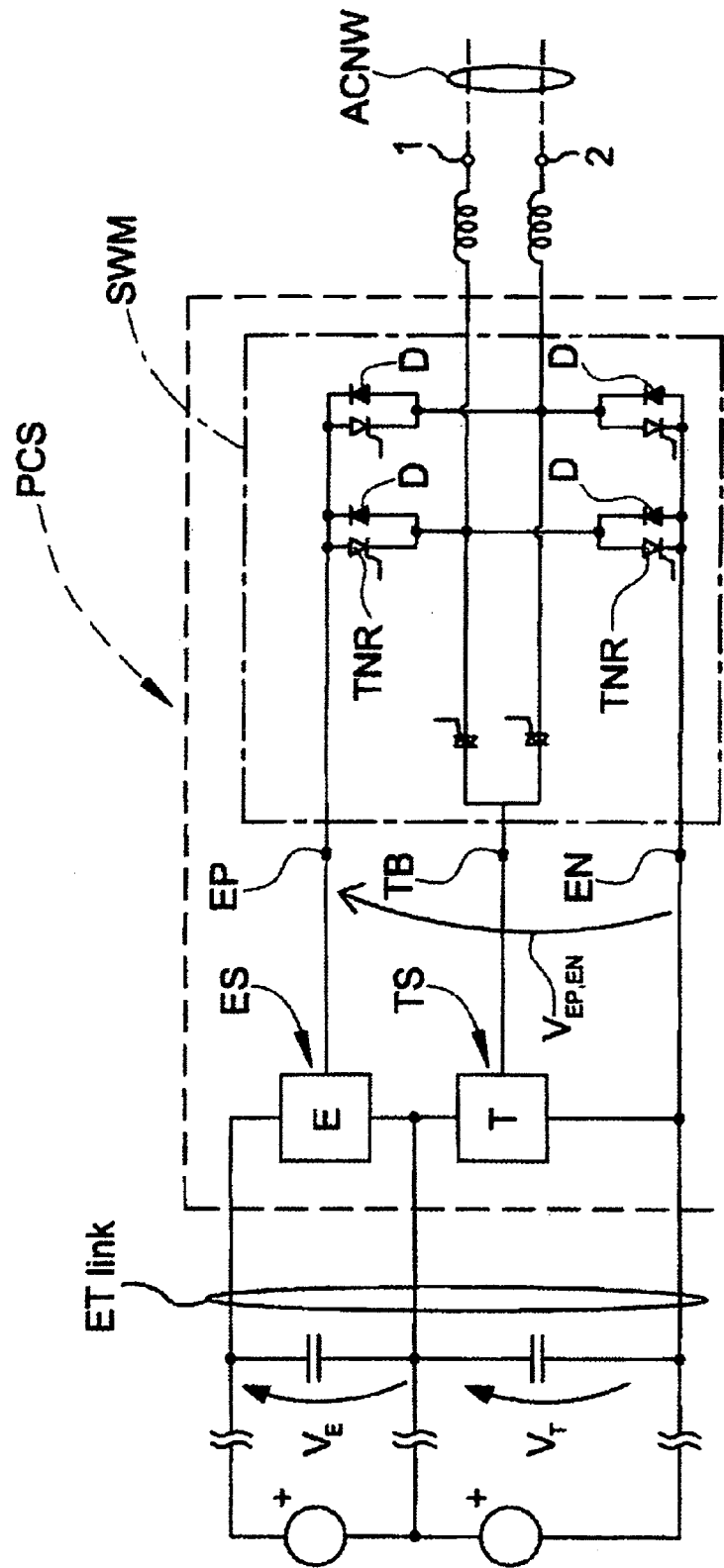
FIG. 3 is a schematic circuit diagram of a single-phase inverter with converters for the E and T components, supplied in corresponding ranges of DC voltage.

With reference to the single-phase case of FIG. 2, an ETAC converter can theoretically be constructed as shown in FIG. 3, in the configuration which can be called "ET/AC", where the slash between the ET and the AC shows that the type E and T (envelope and transition) conversion systems, indicated by ES and TS respectively in FIG. 3 and formed, in the illustrated example, by typical simple cells (inverter leg modules), are structurally separated by an array for inversion and connection to the network ACNW, indicated by SWM and constructed in a conventional way.

In the case of FIG. 3, the "switch array" SWM, described in detail below, is designed for controlled diode switching, simply to emphasize that what is being described here is the switching of alternating quantities, not PWM regulation.

The case of FIG. 3 shows other structural aspects, namely:
- the DC network must generate the two continuous voltages that are required; however, the filter capacitors are in series, and more specifically they are not flying capacitors of the type used in other multi-level structures;
- in the schematic implementation shown in the drawing, the array of AC switches SWM is not generic, because, for the purpose of envelope formation, at least one set of thyristors could be replaced by simple diodes, identified and indicated by D in the drawing, and therefore the reversibility of the off states of the thyristors TNR in parallel with these is not essential.

Each switch of the array SWM has double multiplicity to allow the two-way connection of each of the three terminals (EP, TB, EN) of the ET conversion to the two terminals of the single-phase network ACNW, making a total of six two-way switches or twelve one-way switches.

Because of the claimed definition of the sub-range ER of values, the type E conversion system, in other words the ES converter, has the best properties of conversion of the active power exchanged with the AC network ACNW.

Most of the active power should therefore be conveniently converted by this system ES, which by definition has better properties in terms of efficiency than PWM regulation, simply because the width $V_E$ of the range of regulation ER is very small compared to the envelope amplitude VEA:
- the switching losses are reduced at least in proportion to the ratio $V_E/(V_E + V_T)$;
- in any case likely to be of real interest, this ratio $V_E/(V_E + V_T)$ is strictly less than ⅓, at least in the nominal or design operating conditions of the converter;
- the converter ES can therefore be constructed with components for a nominal voltage which is reduced in proportion, generally characterized by much better dynamic and conduction properties, thus providing further benefits;
- this is also true of the design of the filter reactances required for E conversion.

The complementary system TS, for the transition conversion (T), can be designed in a different way, for example in order to reduce costs, or can include auxiliary or secondary system functions, since it will have less effect on the overall performance.

The converter TS can even be omitted, in specific cases where only the active power is of interest, in other words cases in which distortion of the AC current waveform is acceptable.

Multiphase Properties of ET Division: Continuity of "E" or Envelope Conversion A multiphase system comprises multiple alternating components which have the property of being offset with respect to each other during the period, regularly or with small errors of phase shift or relative symmetry.

Independently of the number of phases, the waveform and the symmetry properties, all the quantities of a multiphase AC network can conveniently be regulated by a specific application of the method of ET division of each AC quantity.

This is because the range of values of the envelope voltage of any multiphase system, including two-phase orthogonal systems, meets the requirements of ET division and defines the range of regulation of the envelope conversion system which enables it to be used continuously, being switched towards the phases of the multiphase AC network.

By definition, the range of values of the envelope voltage, of the potentials of the multiphase AC network, forms the range ER of ideal "continuous" regulation of the converter, or of the conversion subsystem, of type E.

Because of this continuity, the efficiency properties provided by the general principle of ET efficiency can be used "continuously"; above all, however, it provides most of the competitive cost advantage of ET conversion: a single subconverter or conversion subsystem ES, of type E, regulates each AC electrical quantity in the sub-interval of the AC period in which the individual AC quantity coincides with the multiphase envelope.

Figure 4:
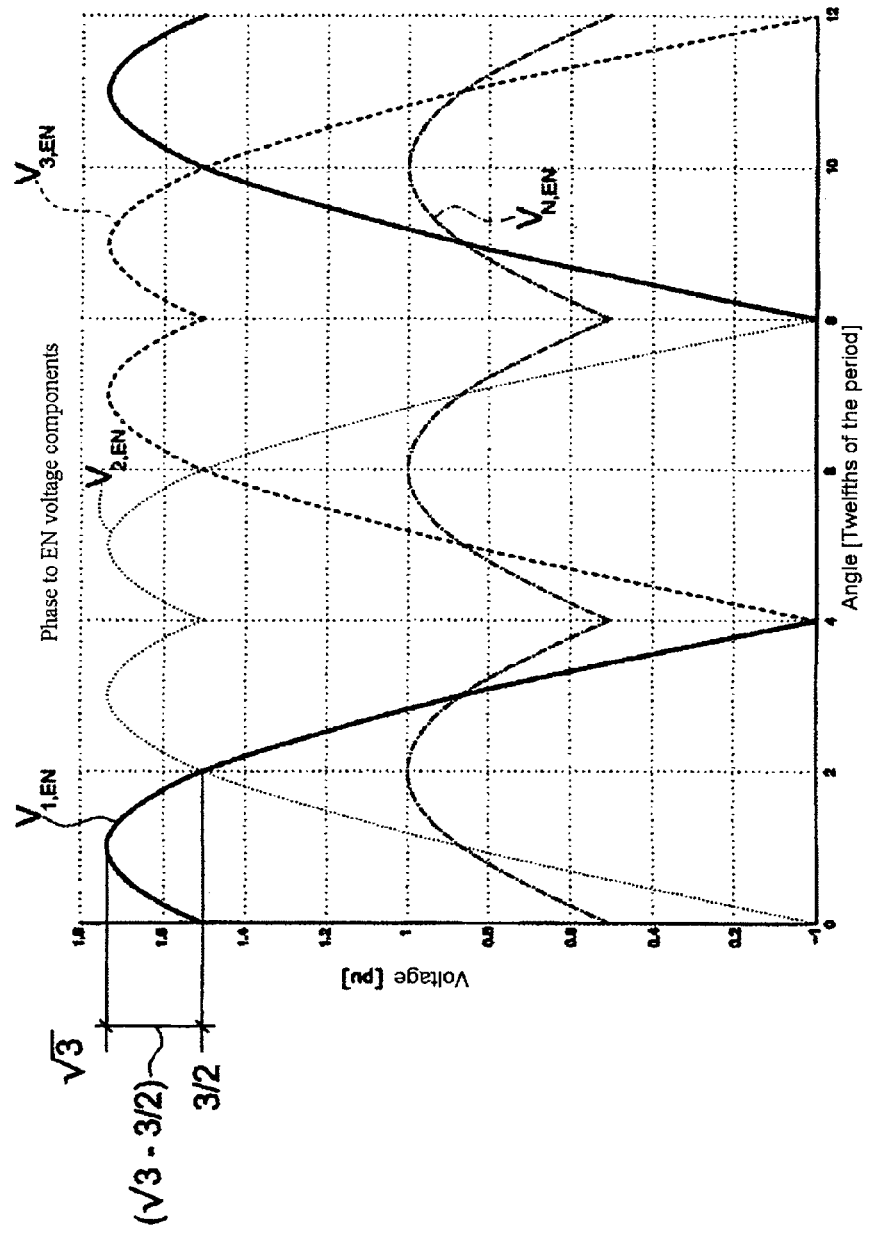
FIG. 4 is a diagram which shows the composition of the variation of the envelope voltage of a regular symmetrical set of three sinusoidal phase to neutral voltages of unit amplitude.

FIG. 4 shows a graph of a symmetrical sinusoidal three-phase system which is typical for any energy application, in which the potential of the negative envelope "EN" is used as the zero reference. The reference potential which is used can equally well be that of the positive envelope or that of the midpoint "M" having the intermediate potential between the two envelope potentials, which is more useful in applications which require control of the neutral conductor.

In the case of sinusoidal quantities of a regular multiphase system, the characteristic values for ET conversion are defined, because for these the envelope voltage has a maximum value equal to the envelope amplitude and a minimum value which is:

greater than 70.7% of the envelope amplitude for two-phase orthogonal and four-phase systems;

greater than 86.6% of the amplitude in the three-phase system.

Figure 5:
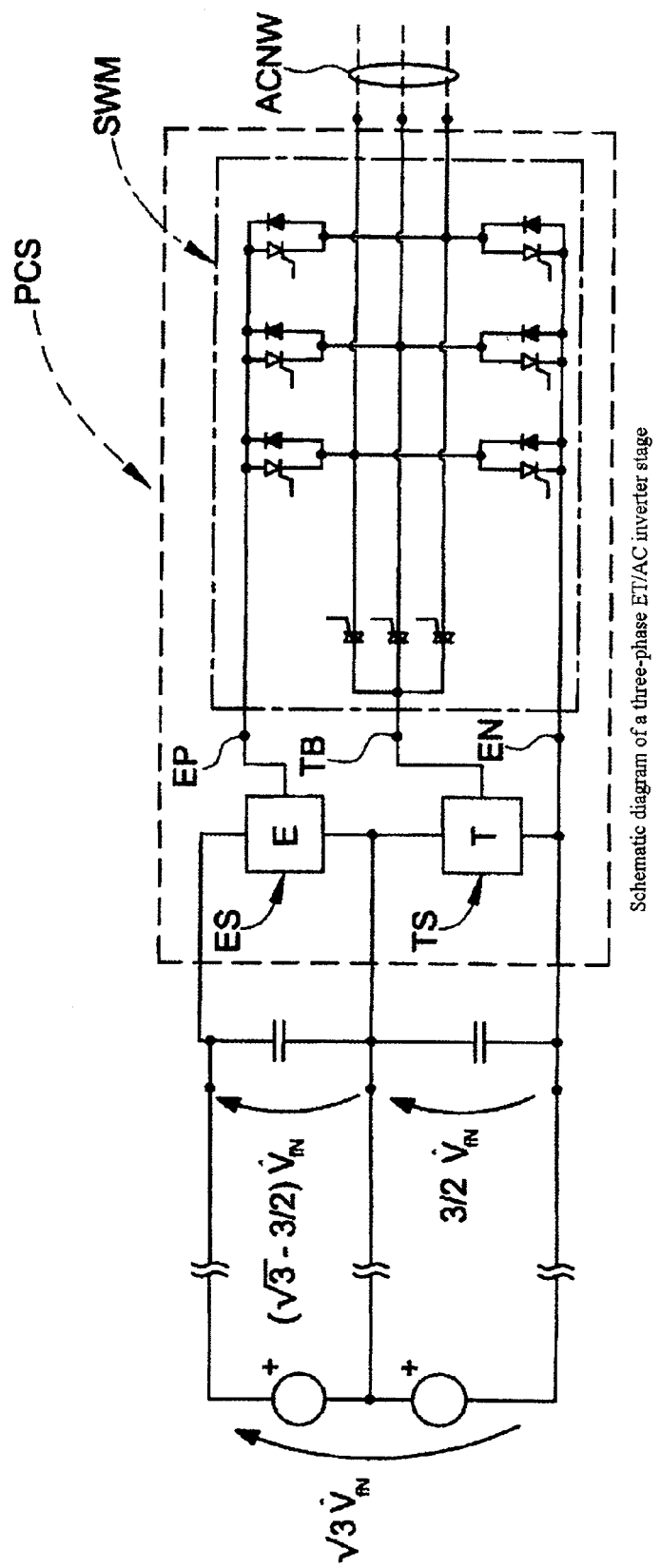
FIG. 5 is a schematic electrical diagram of one stage of a three-phase inverter according to the invention.

With reference to the symmetrical sinusoidal three-phase case of FIG. 4, an ETAC converter can theoretically be constructed as shown in FIG. 5, in what is called the "ET/AC" configuration, for separating the ES and TS conversion systems of type E and T from the array SWM used for inversion and switched connection to the three-phase AC network ACNW.

The typical ranges of ET regulation are shown in FIG. 5 as a function of the amplitude $\hat{V}_{fN}$ of the phase to neutral components of the three-phase voltage, the envelope amplitude being equal to $\sqrt{3}\hat{V}_{fN}$ (=amplitude of the phase to phase voltage components).

As in the case of the single-phase inverter of FIG. 3, the array SWM is conventionally and theoretically constructed from thyristors, although these are specialized because simple diodes are used for the regenerative envelope functions, and the thyristors in parallel with them are therefore not reversible, whereas reversibility is necessary for all the thyristors connected to the transition converter TS.

In FIG. 5, the unit SWM appears similar to that of the single-phase case of FIG. 3, but each type of switch is repeated in the three-phase "3" multiplicity, instead of in the single-phase "2" multiplicity.

Overlap of the ET Regulation Ranges in Actual Converters

The elementary circuits described above are conceptually and technically incomplete. The perfect contiguity between the regulation ranges gives rise to problems of application, for example in real multiphase systems characterized by non-symmetry between the phase quantities, and in the use of the "natural" switching properties of real thyristors.

The theoretical solution is to create a regulation range which overlaps the two contiguous E and T ranges, and which is therefore called "ETR". In particular, this ETR range is preferably provided by the transition converter TS, according to the general principle of cost and efficiency.

Figure 6:
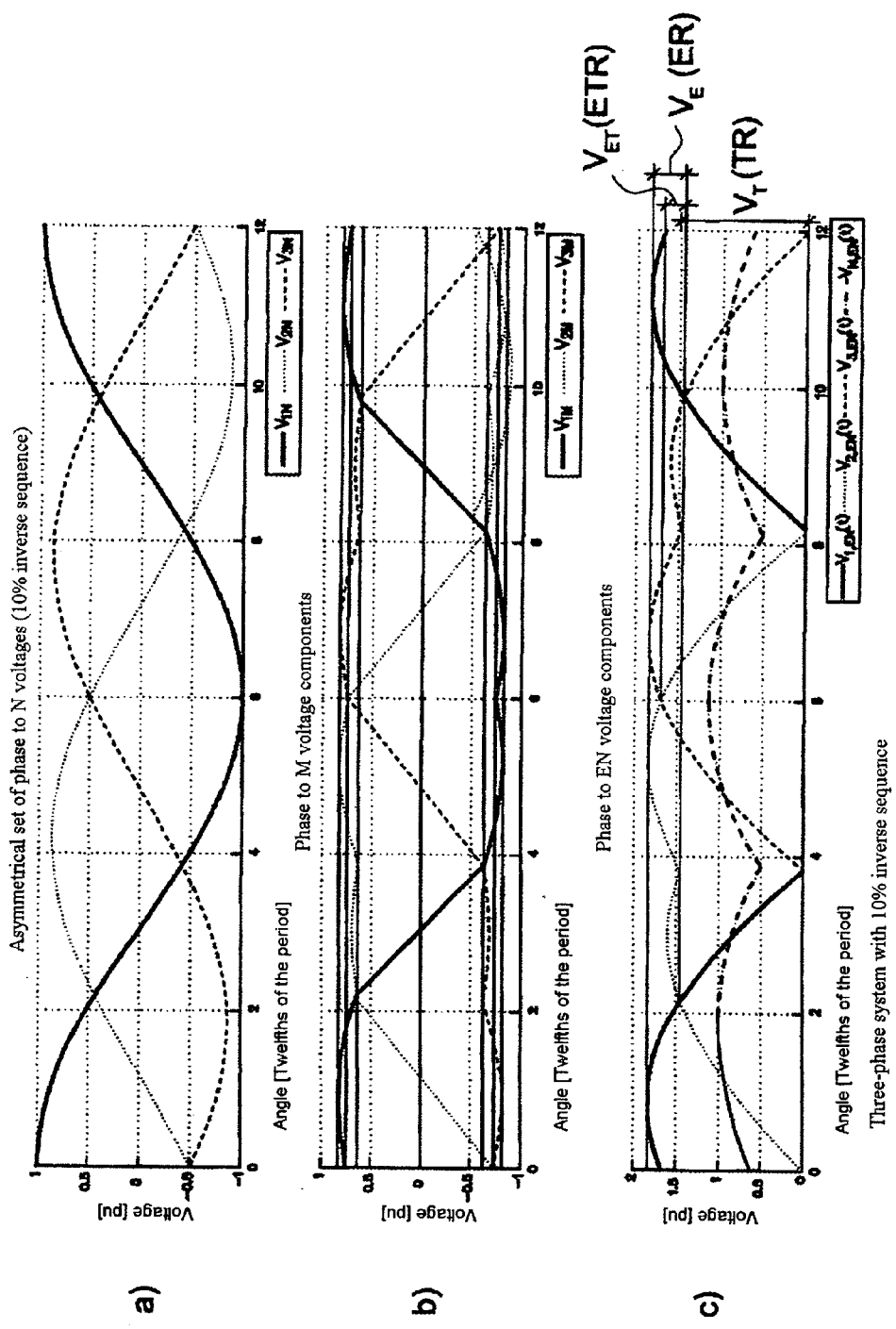
FIG. 6 is a set of diagrams showing the variations of voltage components in a three-phase system.

By contrast with the ideal case shown in FIG. 4, the non-symmetry between the phase quantities in FIG. 6 permits a clear definition and graphic visualization of this overlap range ETR.

FIG. 6 shows the quantities of a three-phase system in which the set of three typical sinusoidal components is supplemented by a set of three which is also sinusoidal, having an inverse sequence and an amplitude of 10% of the typical value, this value being excessive but being used to improve the graphic representation.

In particular, FIG. 6a) shows this non-symmetrical set of three phase to neutral voltages, FIG. 6b) shows the same set of three in the phase to M components (where the phase potentials are related to the mean potential of the upper and lower envelopes of the phase potentials), and FIG. 6c) shows the same set of three voltages, in the phase to EN voltage components (where EN is the negative envelope), to which the neutral to EN voltage is usefully added.

For the case of FIG. 6 also, the width $V_E$ ideally associated with the envelope regulation range ER is defined by the range of values of the envelope voltage, which is wider than in the typical case because of the presence of the inverse sequence.

Retaining the definition of the envelope amplitude as $V_{EA}=V_E+V_T$, it should be noted that, in some phases, the transition component comprises values greater than $V_T$; in other words, it partially "enters" the envelope regulation range ER which has the ideal width $V_E$.

In conclusion, with reference to FIG. 6c), continuous regulation of the individual AC quantities can be achieved by the following definition of the ideal value of the width $V_{ET}$ of the regulation range ETR, which partially overlaps the contiguous fields having widths $V_E$ and $V_T$:

$V_E$ is defined as the actual width of the range of values of the multiphase envelope voltage;

the envelope amplitude is defined as $V_{EA}=V_E+V_T$;

the maximum value of the transition is defined as $V_T+V_{ET}$, and is equal to the maximum value of the relative minima of the envelope voltage, the value $V_{ET}$ is then defined.

Clearly, this overlap range ETR increases the design complexity of the conversion system, but does not necessarily increase its structural complexity.

This confirms that it is preferable to limit any necessary overdimensioning to the transition conversion system TS, so that the cost of the envelope conversion system ES can be minimized by designing it for the minimum necessary width $V_E$. This is because, by definition, $V_{ET}<V_E\ll V_T$, and therefore the inclusion of $V_{ET}$ in the total width of the transition regulation range, which would be increased from $V_T$ to $V_{ET}+V_T$, would increase the cost of the transition conversion by an amount which was insignificant in percentage terms.

Additionally, it may be useful in practice to explicitly generate the voltage $V_{ET}$ only if $V_{ET}\ll V_E$; otherwise, if these values are similar, as in the case of FIG. 6, it is generally convenient to make them coincide ($V_{ET}\equiv V_E$) for simplicity.

With widely differing design values and criteria, the application of this overlap principle permits the control of the switching modalities of the switches that have to switch the regulated overlapping currents. For example, in this way it is possible to use more efficient and less costly thyristors, suitable for natural switching only.

Symmetry of the Envelope Conversion

According to the overlap principle, it is clearly useful to be able to regulate and control the connection switching between the ET and AC terminals, which takes place in the area of both the envelope potentials. For this and other reasons, it appears preferable to use structures having properties of symmetry, especially for the symmetrical control of the envelopes and their properties.

The point and corresponding potential of symmetry of the envelopes is called the midpoint 'M', the potential of which is defined at any instant as the intermediate potential between the potentials of the upper and lower envelopes of the potentials of the connections to the regulated AC network.

With reference to the sinusoidal three-phase network which is non-typical because of the inverse sequence component, the second graph of FIG. 6b) shows the potential differences between the AC connections and said midpoint M. The fact that the reference potential is identical with the midpoint potential shows how the two envelopes are balanced with respect to it, in other words with a zero sum.

Each definition relating to the division and the ET regulation ranges is applicable to the individual envelopes by simply dividing by two the result for the total envelope voltage, particularly the result for the definition of the overlap range ET.

Figure 7:
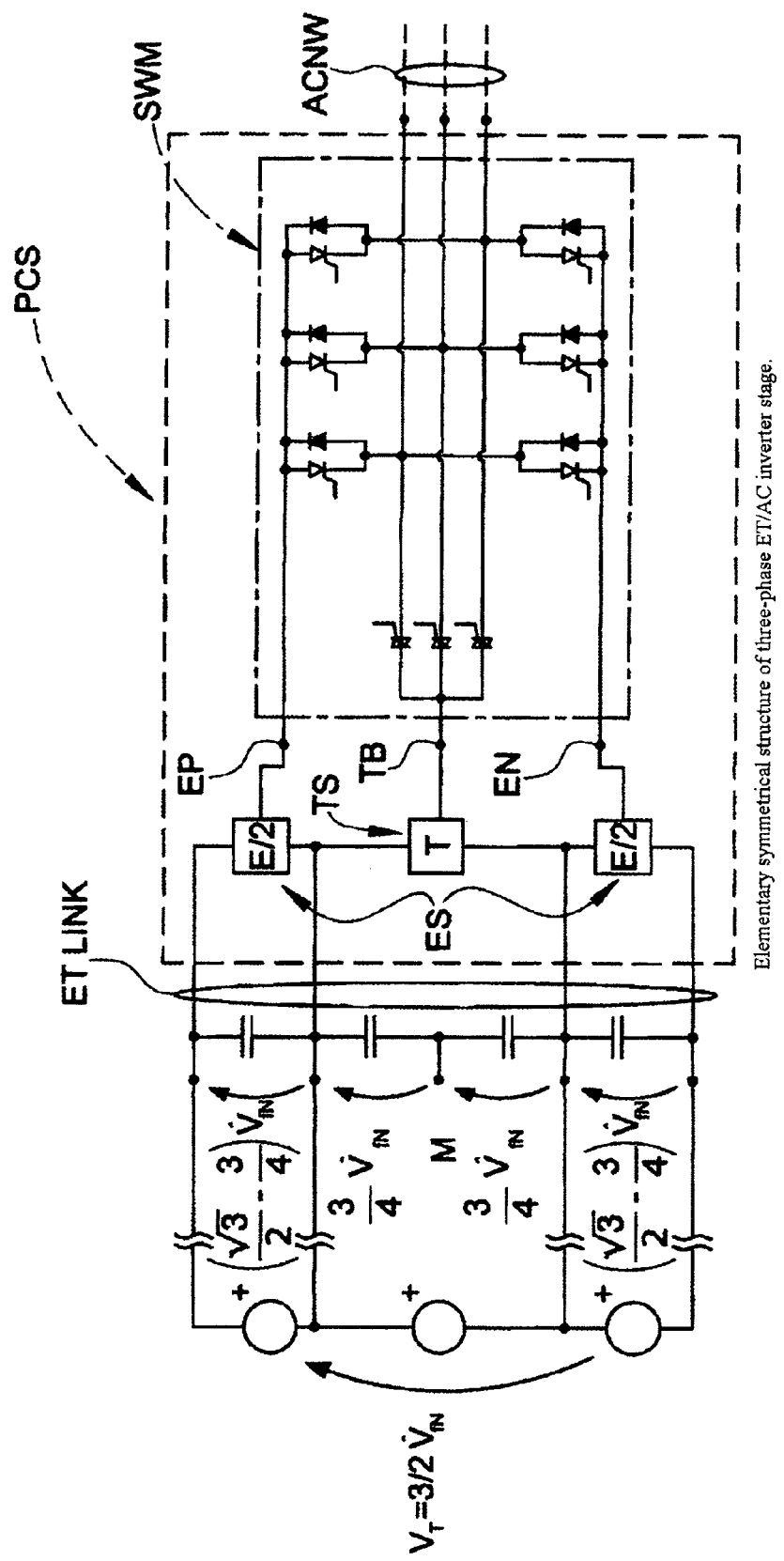
FIG. 7 is an electrical diagram showing an elementary structure of a stage of a three-phase inverter according to the invention.

For the purposes of visualization, FIG. 7 shows the circuit, symmetrical about the midpoint M, for the elementary case of a three-phase ET/AC stage, shown previously in FIG. 5. In FIG. 7, the envelope converter ES is divided into two "E/2" converters, each supplied at half of the total range of values of the envelope voltage, while it is unnecessary to modify the transition converter TS or the switch array SWM.

The division of the voltage applied to the transition converter TS can be used to define the midpoint, but it is not necessary unless a power connection, by homopolar conversion for example, which is not included in the diagram of FIG. 7, is expressly requested.

Division and Specialization of Homopolar Conversion

In the multiplicity of connections to a multiphase AC network, it is possible to distinguish one in particular, in cases in which the neutral point is present and the conversion system is required to control it.

In all cases concerned with power applications, the neutral potential has no effect on the definition of the properties of the ET division, since it always lies between the two envelope potentials. Additionally, the current of the neutral connection to be regulated, when required, is always much lower than the line current. Ultimately, any homopolar converter, in other words a specialized converter for regulating the neutral current, is characterized by much smaller dimensional requirements than those of the multiphase converter.

In particular, the homopolar converter can be configured in a simple way if the midpoint "M", defined above with respect to the potential envelopes of the multiphase AC network, is available in the multiphase conversion system.

Figure 8:
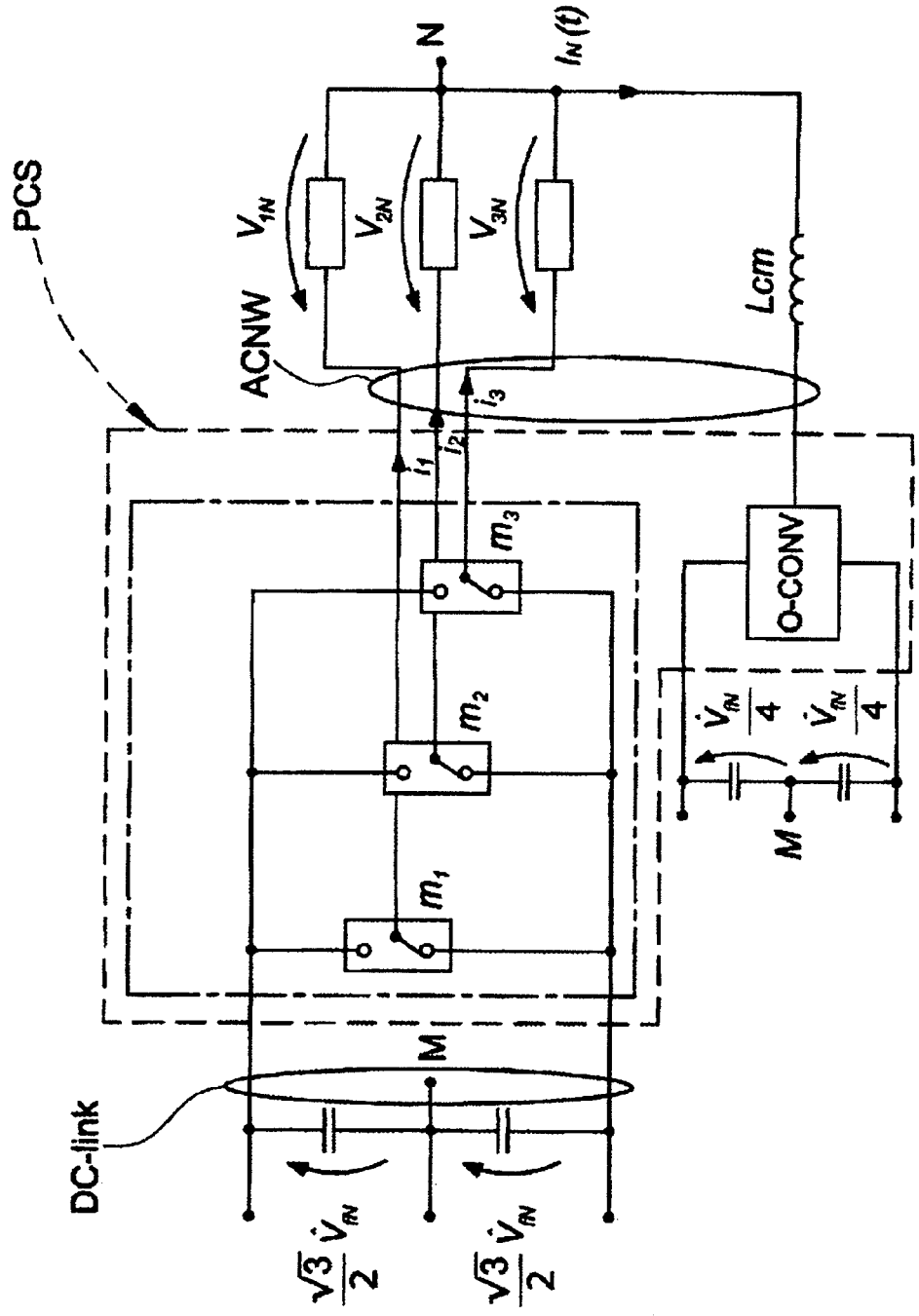
FIG. 8 is an electrical diagram of a three-phase inverter to which a homopolar converter is added.

FIG. 8 shows a possible circuit for the addition of a homopolar converter O-CONV to a multiphase power converter PCS.

In the case in FIG. 8, the multiphase converter is a "two-level" three-phase inverter according to the state of the art of conversion without a neutral connection, the DC link supply to which comprises the midpoint M defined above. In the case of a pure sinusoidal set of three, it is sufficient to have a homopolar regulation range of $\pm\frac{1}{4}\hat{V}_{fN}$. The reduced voltage is combined with the modest value of the neutral current which is generally required, to demonstrate the convenience of this combination.

For example, it can be demonstrated that in all three-phase systems of practical interest the proposed combination is advantageous compared with the overdimensioning of the inverter PCS which would otherwise be necessary for the neutral regulation without a dedicated homopolar converter O-CONV.

Such a homopolar converter O-CONV can always be added without modifying the multiphase conversion structure of any conversion circuit without a neutral connection, including ET.

Incorporation of Filters and Snubbers in the ET/AC Array

Because of the overlap of the regulation ranges of the two types, ET conversion also makes it possible to control the current derivatives of the switches included in the switched connection array SWM.

This solves one of the problems of the use of thyristors, but another problem arises from the need to limit the voltage derivative applied to the thyristor, with rather low values where the most efficient, least costly and therefore "slow" thyristors available on the market are used.

In innovative applications, it is recognized that it is useful, if not necessary, to provide a capacitive filter to ensure a non-discontinuous supply regardless of the discontinuities of PWM regulation. In these cases, ET conversion, which offers multi-level performance and therefore the possibility of efficient high-frequency modulation, can benefit to the greatest extent from an incorporation of the filter and snubber functions associated with the thyristors in the ET/AC switched connection array SWM.

In particular, a snubber capacitor, CSN, can be connected directly in parallel with each switch, without diodes or resistors, because the switching can be controlled by the ET converters having overlap ranges.

Figure 9:
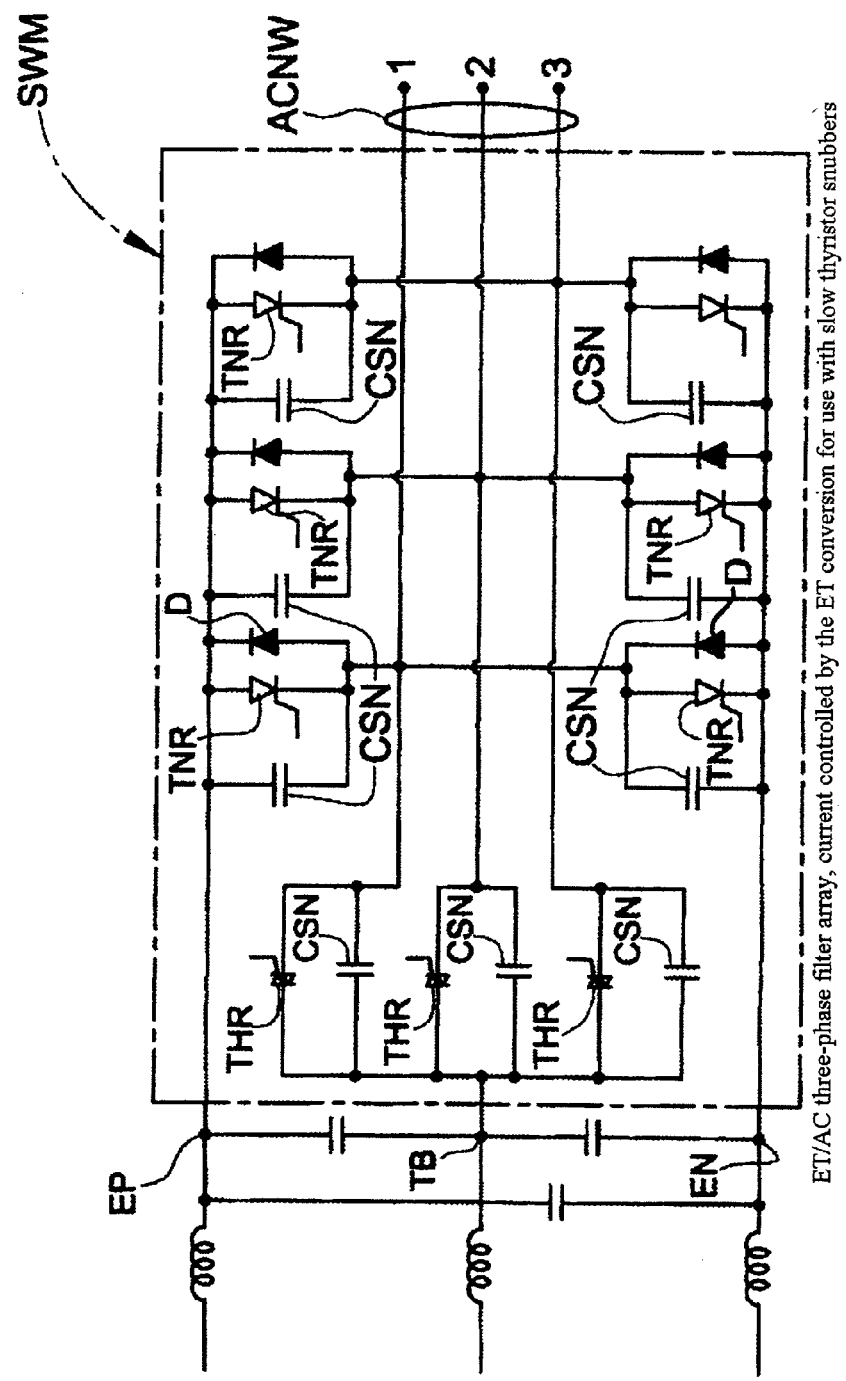
FIG. 9 is an electrical diagram of a current-controlled three-phase filter array using snubbers.

Clearly, in this case the inductances for the control of the envelope and transition currents in PWM mode have to be interposed between the ES and TS converters and the array SWM provided with snubber capacitors, as shown within the rectangle drawn in broken lines in FIG. 9.

FIG. 9 shows a basic circuit for a three-phase two-way SWM. Clearly, the snubber capacitors CSN can conveniently also provide a full filter function. Additionally or as an alternative to the capacitors in parallel with the switches, it is possible to use a typical set of three capacitors (in star and/or triangle configuration) connected to terminals 1, 2 and 3 of the three-phase network ACNW.

It is also possible to provide a further set of three filter and snubber capacitors, connected between the envelope terminals EP and EN and the transition terminal TB.

It should be noted that the ET conversion in overlap of the two types of regulation range makes it possible to control the derivatives of current and voltage, particularly by bringing the single switch to the zero cut-off voltage drop, thus enabling it to switch to the closed position without any discontinuity or pulse, and therefore making it unnecessary to provide the conventional resistors in series with the snubber capacitors.

As suggested by FIG. 9, the construction of this circuit enables TRIACs to be used correctly for switched connection to the transition conversion system; otherwise, the TRIACs would be incompatible with any PWM application, owing to the high values of the voltage derivatives.

Solutions with Multiphase Multiplicity of the Transition Converters

One of the problems of ET conversion arises from the need to regulate the DC voltages which define the ER and TR regulation ranges. In some applications this regulation is useful in step-up mode, whereas it would not be desirable to provide it at low or zero values.

These cases can be avoided by sacrificing some of the cost advantages of ET conversion, by multiplying the number of transition converters TS by the number of regulated AC connections, so as to provide multiple possibilities of step-down regulation of the AC network with constant values of DC voltage.

Figure 10:
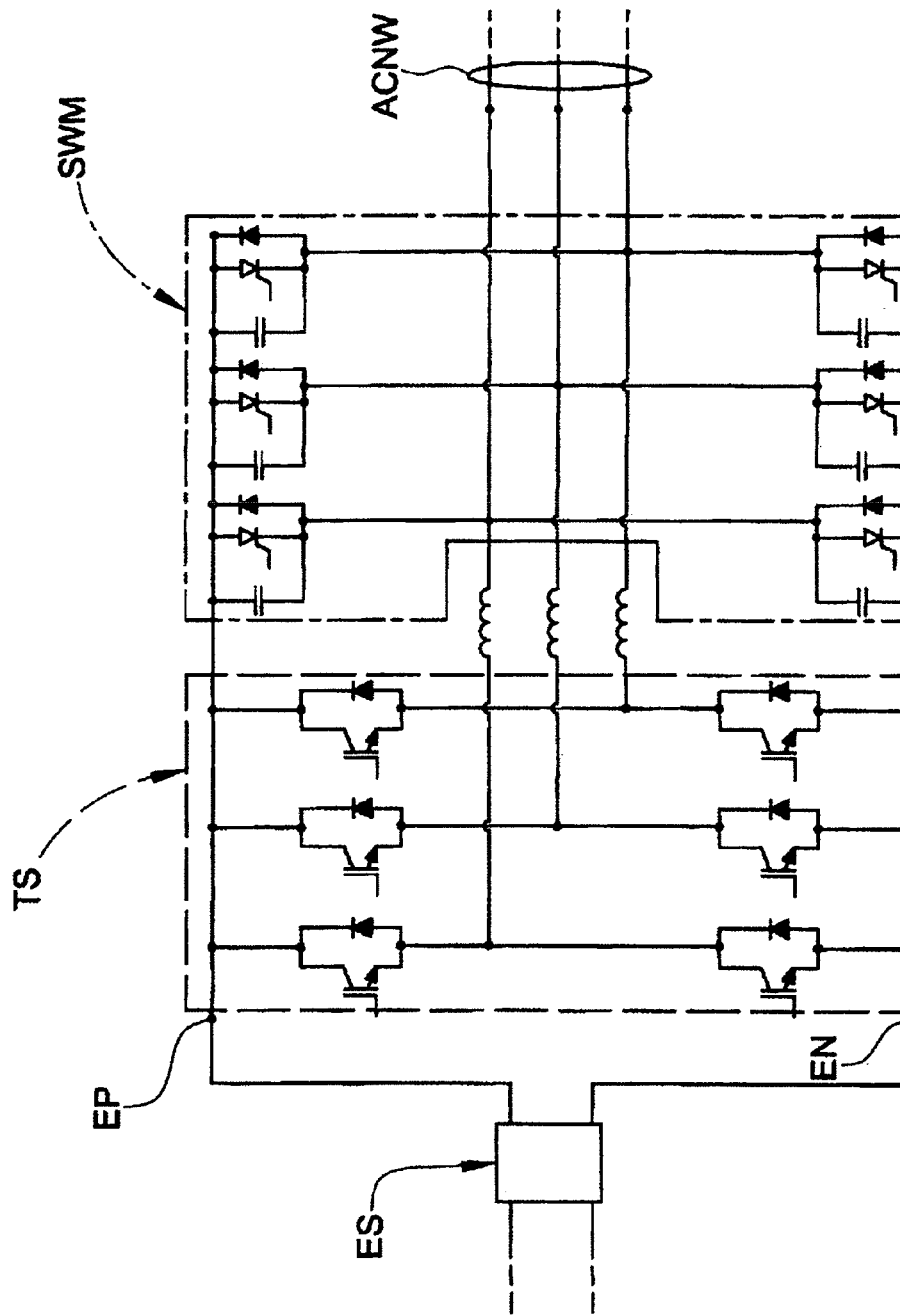
FIG. 10 is an electrical diagram of a three-phase transition stage directly connected to the AC network, associated with a connection array for envelope converters.

An interesting case is the three-phase system shown in FIG. 10, in which a whole three-phase inverter is used in practice as the transition converter TS, in parallel with an array SWM of envelope switches provided with snubber capacitors. This system is designed on the assumption of an envelope conversion capable of regulating the envelope voltage at the maximum values of voltage and power, at which a switch of the array for each envelope is permanently conducting. As the voltage is reduced, this envelope converter ceases to be capable of regulating, and becomes a voltage generator, and therefore only one of the two envelopes can be connected directly to the network ACNW through the array SWM.

Using the conduction of the switches of SWM is much more efficient than the possible alternative of PWM TS transition conversion. One phase is therefore connected to one envelope and the other two phases are regulated in PWM mode by two of the three inverter legs provided for TS transition conversion.

The current which can be regulated in these conditions of reduced voltage amplitude may be less than that which can be conducted when the envelope conversion is fully operational, but in many applications this is a requisite, or is at least acceptable.

Figure 11:
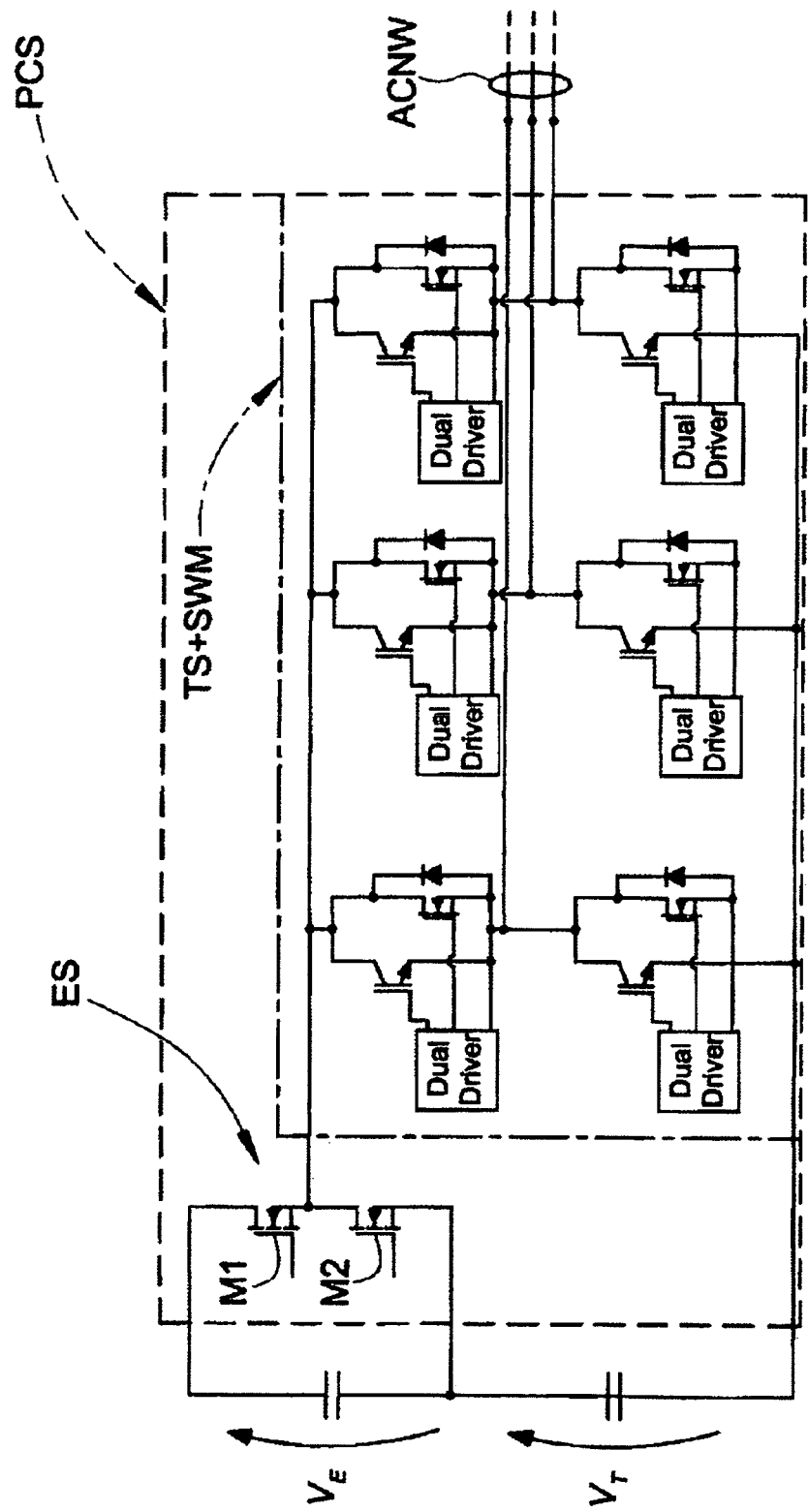
FIG. 11 is an electrical diagram of a three-phase inverter incorporating three transition converters and a connection array driven by a MOSFET envelope converter.

Another interesting case is that of the complete integration of the transition function and the function of switched connection to the AC network shown in FIG. 11, again for a three-phase system. In this system, designed for industrial voltage, a pair of MOSFETs M1, M2 provides the PWM envelope regulation in its range of values of the width $V_E$, applying the switched voltage to a "TS+SWM" circuit which in its entirety appears to be an ordinary three-phase inverter. In reality, each switch in this circuit is composed of two transistors in parallel, one of these transistors being very fast (MOSFET) for the transition PWM, while the other is very slow (IGBT "low-sat") and can be operated in an alternative way for efficient switched connection to the network ACNW.

This solution is characterized by high efficiency and the low cost of the filter reactances, but the overall cost of the semiconductors is not reduced, and all the components must be able to withstand the very high voltage derivatives created by the MOSFETs in forced switching to provide the PWM regulation.

One-Way Transition Modularity for AC Regulation

In the application of the ET division, the transition conversion is by far the most costly conversion because of the width of the regulation range, which is smaller but close to the envelope amplitude, and therefore if this is multiplied by the number of AC connections (as in FIGS. 10 and 11) this cancels out the semiconductor cost benefit characteristic of the ET division.

However, ET division offers a different possibility of step-down regulation of the AC network without increasing the cost of the semiconductors, for the further benefit of all cases in which the DC link has to be regulated in step-up mode, as in all types of DC generators or accumulators, for example.

This is because the output of the transition converter TS is of the AC type and is therefore bidirectional, and can always be conveniently broken down into the two constituent unidirectional structures. By controlling them independently of each other, these structures can regulate two current components of the network ACNW separately, the only constraint being that of opposing directionality. However, this constraint can be disregarded in AC networks, in which the sum of the currents is zero or very small.

It will certainly be necessary to provide a modified switched connection array SWM, having two independent transition connections of opposing directionality for each bidirectional transition connection provided for connection to the multiphase network ACNW.

For a three-phase AC network there is a single transition component and the array SWM provides a switched bidirectional connection for this component, as in FIGS. 5, 7 and 9.

To connect mutually independent unidirectional components to the AC network, it is simply necessary to separate the common connections of the switches having the same directionality.

Figure 12:
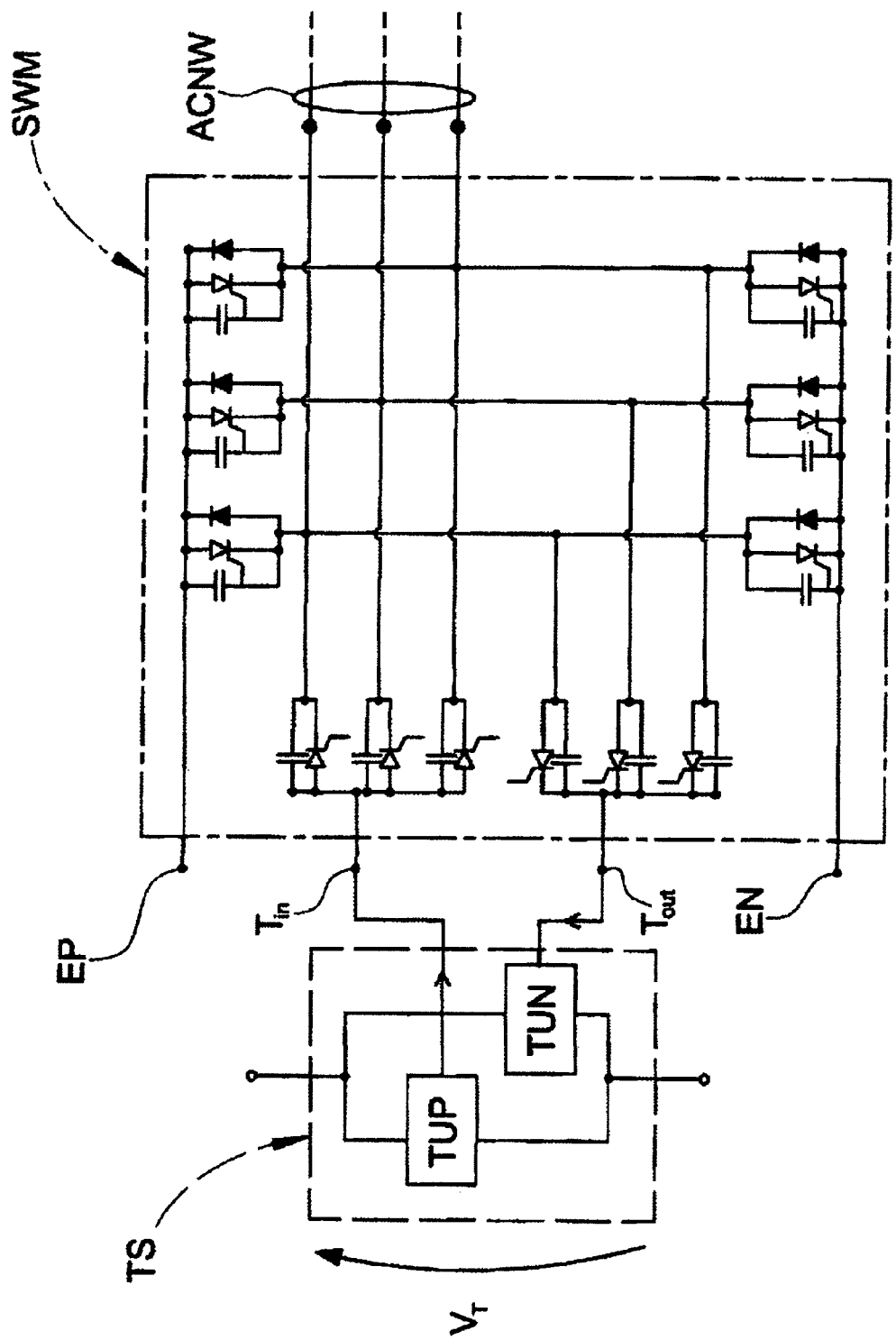
FIG. 12 is a diagram comprising a switched array for connection to a three-phase AC network which allows the independent connection of two transition current components which have opposing directionality and can be regulated independently.

In the case of FIG. 12, the concept is applied to the bidirectional transition current, by deriving from a bidirectional 3×3 array the 4×3 array of FIG. 12, characterized by two separate unidirectional transition connections $T_{in}$ and $T_{out}$, the current of which can be regulated independently by corresponding independent converters TUP and TUN.

Figure 14:
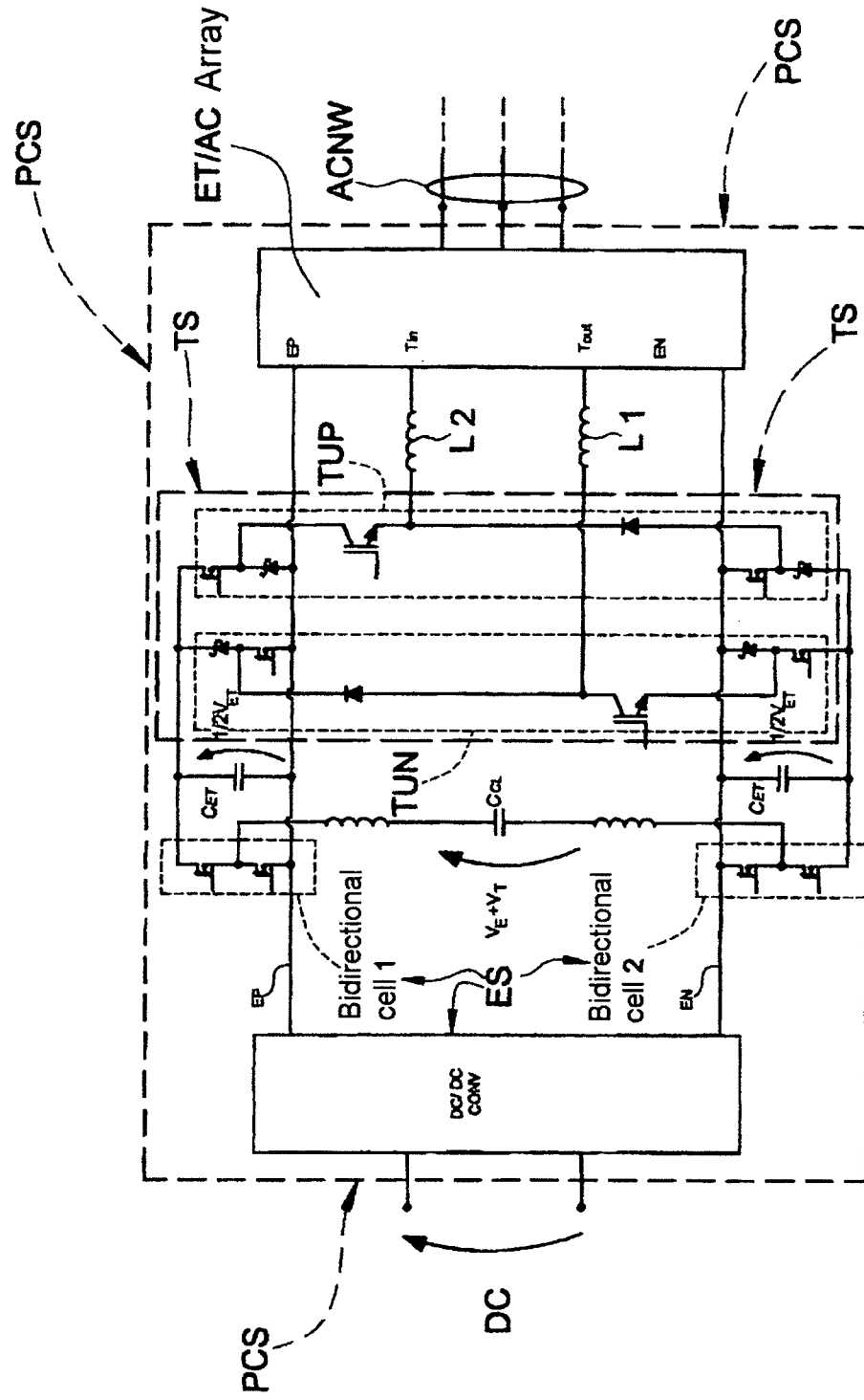
FIG. 14 is another diagram of a direct DC/AC active power converter using an envelope voltage DC link.

FIG. 12 illustrates the case of thyristors having snubber capacitors, which is of greater practical use, and is explicitly used in the structures of FIGS. 13 and 14 for correct coupling to a double system of unidirectional transition converters.

In the simplest three-phase case, the transition converter TS is single and is bidirectional, formed by an inverter leg. However, this inverter leg is actually composed of two typical cells of opposing directionality.

Therefore, when the inverter leg is broken down into the two unidirectional typical cells regulated in a mutually independent way, as also shown in FIGS. 13 and 14, since two of the three line currents will be of one sign and the third will be of opposite sign, conversion can also be achieved by regulating two transition currents, having different moduli and of opposing signs, in two different AC phases, in combination with the conduction of one envelope switch only for supplying the third phase.

The phase selection derives directly from the principle of ET division, since at least one of the two phases which have the same current sign generates one of the two envelopes, this phase being suitably connected to this envelope by the 4×3 array SWM (FIG. 12). Therefore, the other two components must be of opposite sign, and by definition can be regulated in the transition regulation range by the two unidirectional transition cells.

In the other cases, in which the two phases of identical current sign both generate the envelopes, there is a further degree of freedom in the selection of which of the two envelopes is to be connected to the AC network by means of the 4×3 array, while keeping the third phase, which has the opposite current sign, in the regulation range of the transition conversion.

Direct Envelope Conversion

Envelope conversion can conveniently be carried out by an envelope conversion system ES comprising a dedicated PWM regulator with a mean power which is very small (as in the bidirectional cells 1 and 2 of FIG. 14), or even zero (FIG. 13).

This is possible, and may be very convenient, in all cases in which PWM envelope regulation of this kind can be added to a separate regulation of the active power only, which is obtained in a different way and is suitable for, or already provided by, the application.

An example of considerable practical interest is the adaptation of real DC voltage sources such as batteries, fuel cells and photovoltaic modules.

In particular, there is now widespread agreement in favour of using a DC/DC step-up conversion stage with substantially constant power equal to the active power to be converted into the AC network, or into an electric motor which is usually three-phase.

In all these cases, ET division can be used in a specific form, in order to obtain conversion properties which are so distinctive, in terms of the achievable efficiency, that this conversion process can even be justifiably referred to as "direct envelope conversion". In the following text, this conversion will also be referred to as "direct EE/AC" conversion.

However, it should be noted that these "direct" conversion properties relate to the conversion of some active components of the power, namely the dominant components produced by the envelope component, but not to the regulation of waveforms or reactive or distortion power.

An extreme case of direct ETAC conversion is illustrated in the diagram of FIG. 13, which is theoretical in that an explicit PWM envelope regulator is totally omitted, on the assumption that there is DC/DC regulation which can ideally meet all the requirements of ETAC conversion, including the dynamic ones.

The diagram in FIG. 13 includes other ET properties described above, in addition to the direct conversion of active power. It also introduces the application of an exemplary passive diode and capacitor circuit, for the autonomous or implicit generation of the envelope and transition regulation ranges.

The diagram in FIG. 13 is designed as a total conversion system of the DC/AC three-phase type, with a DC link whose voltage coincides with the envelope voltage ("EE link") generated by the switching of the ET/AC array SWM, which in this specific case has snubbers which act as a capacitive filter as in FIG. 12. The array SWM has a double unidirectional transition converter TS, which is shown in FIG. 13 in the form of two unidirectional typical IGBT+diode cells (cell 1 and cell 2), which control the two unidirectional transition current components by PWM regulation of the current of the corresponding interposed inductances L1, L2. These cells are supplied by the same EE link (EP-EN), but have an incremental regulation range which extends beyond both of the envelopes, and which is therefore overlapping.

In particular, the voltage denoted "$V_{ET}$" at the terminals of each of the two capacitors $C_{ET}$ can always be added to the envelope voltage switched by the IGBT transition cells, by appropriately switching the unidirectional low-voltage MOSFET cells supplied at the voltage "$V_{ET}$". This solution conforms to the principle of ET overlap which is required for non-symmetrical AC networks, and, more particularly, can control the transition current and consequently the current of the thyristors in the array SWM in the time intervals required for the switching of the AC phases carried out by said ET/AC array (SWM).

The normal equilibrium condition of the voltages at the terminals of the capacitors $C_{CL}$ and $C_{ET}$ is established by the ripple of the envelope voltage present at the EE link, through the Schottky rectifier diodes which connect the capacitor $C_{CL}$ to the EE link and to the two capacitors $C_{ET}$ arranged as in FIG. 13:

the capacitor $C_{CL}$ cannot have a voltage below the maximum envelope voltage, and therefore acts dynamically as a "clamp" capacitor, thus preventing excess voltages in the EE link;

in operating conditions, $C_{CL}$ is charged at the envelope amplitude $V_{EA}=V_E+V_T$;

the sum of voltages at the terminals of the two capacitors $C_{ET}$ is equal to $V_E$, applied at the minimum point of the envelope voltage, which is "$V_T$" by definition;

the series of capacitors $C_{CL}$ and the two capacitors $C_{ET}$ acts through the Schottky diodes as a dynamic limiter of the minimum value of the EE link;

it can be assumed that the two capacitors $C_{ET}$ divide the voltage $V_E$ equally between them because of the properties of symmetry (and because of the possibility of regulating the quantity of charge injected and absorbed in the control of the transition currents in the switching intervals of the thyristors of the ET/AC array).

To sum up, the circuit of FIG. 13 is a direct converter of the envelope component of the active power, which permits complete ET regulation of the network ACNW, generating autonomously on the capacitors provided the continuous voltages which are required, at values corresponding to the typical values of ET division. This is because the switching of the ET/AC array generates the envelope voltage on the DC link, which is therefore called the EE link, the maximum and minimum values of which are stored in capacitors through a network of diodes, by means of which a suitable transition conversion structure TS can regulate the reactive powers and waveforms of the network ACNW, and also the current switching in the thyristors of the ET/AC array by application of the principle of ET overlap.

The circuit of FIG. 13 can be used directly in practice with any type of input converter, whether of the step-up or step-down type, which generates a current which is set in the EE link. However, the preferred function of this converter is the regulation of the mean current in the first source, which is generally required to be constant and in a mean active power balance with the total power converted into the network ACNW.

However, in most cases the active power required in the EE link from the ETAC conversion is not perfectly constant, owing to the distorting terms which may be due to the properties of the network ACNW, and as a result of the transients required for the control of the switching of the thyristors of the ET/AC array.

In other words, it is generally preferable to have independence, at least in dynamic terms, between the power regulation towards the input source and towards the network ACNW, as is implicit in the prior art in intermediate DC link systems with adequate energy storage in the DC link.

This concept represents the natural evolution of direct envelope conversion, which therefore provides an independent envelope regulation contribution at a mean power level which is practically zero.

The circuit of FIG. 14 differs from that of FIG. 13 in that it introduces a circuit design with sufficient modifications to meet the requirement of dynamic independence of regulation of the input and output power in a network ACNW:

the network of Schottky diodes is replaced by low-voltage MOSFETs which form two bidirectional typical cells, each supplied by a capacitor "$C_{ET}$" used as in FIG. 13 to extend the transition regulation according to the principle of ET overlap;

the capacitor $C_{CL}$ is connected in series with at least one inductance to enable PWM regulation of the current provided by the switching of both of said bidirectional MOSFET cells;

this current regulated in $C_{CL}$ is identically set in the EE link, as a contribution which is independent of the envelope current and which is regulated by said bidirectional MOSFET cells;

the current design of these MOSFETs determines the maximum share of the current difference, and consequently of the power difference, between the input and output, which can be regulated independently;

the mean value of the voltage at $C_{CL}$ must still be regulated to the level of the envelope amplitude $V_T+V_E$, to enable the two bidirectional MOSFET cells to control its current continuously;

the capacitance of $C_{CL}$ and the controllable variation of the voltage at its terminals determine the time interval in which the power regulation between the input and output must be balanced;

similarly, the sum of the voltages at the capacitors $C_{ET}$ must be greater than, or preferably equal to, the width $V_E$ of the envelope regulation range ER;

since the two bidirectional MOSFET cells conduct the same current, which also flows in the capacitor $C_{CL}$, it is therefore possible to continuously regulate the voltage distribution between the two capacitors $C_{ET}$, to which identical voltages are assigned in FIG. 14.

To sum up, the circuit of FIG. 14 is a direct, or rather quasi-direct, converter of the envelope component of the active power, which allows the complete ET regulation of the network ACNW, generating autonomously on capacitors which are provided the necessary continuous voltages, the value of which can be regulated and is on average equal to the typical values of ET division, while also allowing dynamically independent regulation of the input and output power by PWM regulation of the current in the capacitor $C_{CL}$ provided in an intermediate branch which also acts as a circuit for limiting the excess transient and protection envelope voltages.

The conversion is direct, but may correctly be called quasi-direct, in spite of the requirement for zero mean power, when the current rating of the intermediate envelope converter is of the same order of magnitude as the amplitude of the envelope current.

Quasi-Direct AC/ET/AC Conversion Between AC Networks Having Equal Amplitude

In ETAC a possible singularity of design and performance is recognized when conversion is required between networks which are entirely different in their frequency, power factor, neutral connection type and even number of phases, but which are characterized by identical voltage amplitudes, or, more generally, by equivalent values for the purposes of ET division.

The case we are concerned with corresponds to ranges of ET regulation of the two networks which are identical or very similar, making it particularly useful to attempt to overlap or unify them.

This can be done by a special application of the principle of ET overlap, by defining a new range of envelope regulation, "EER", formed by combining the ranges of envelope regulation of all the networks interconnected by the ET conversion.

In other words, the resulting voltage $V_{EE}$ represents the ideal, necessary and sufficient width of the regulation range EER required for the envelope regulation of all the interconnected networks.

The voltage value denoted $V_T$, on which the transition conversions are based, continues to be similarly defined by the smallest possible value of all the multiphase envelopes. Finally, the width $V_{ET}$ of the overlap range ETR is again defined in such a way that the value $(V_T+V_{ET})$ can allow the continuous regulation of all the transition components, for all the networks interconnected by the ET conversion.

Figure 15:
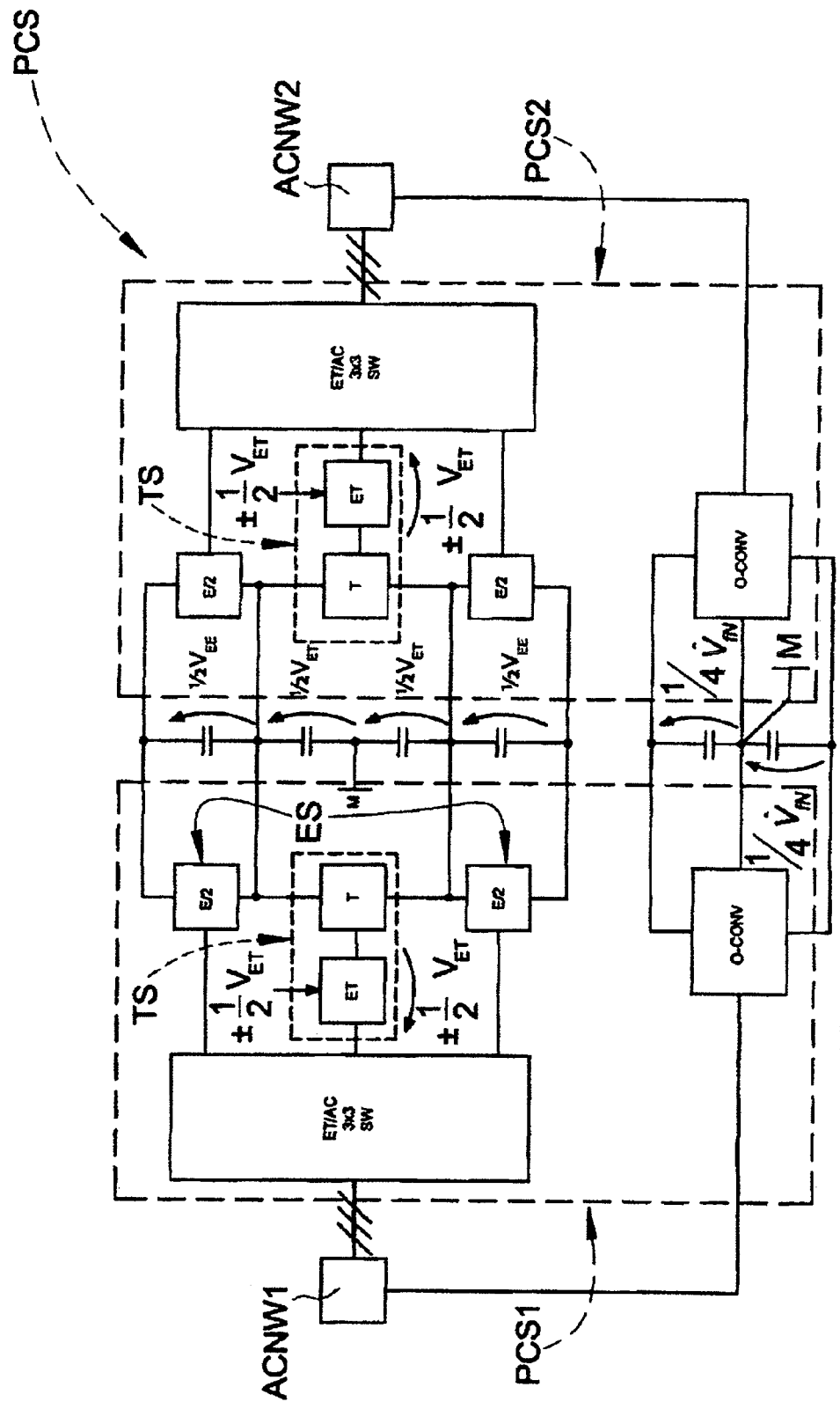
FIG. 15 is a diagram of a complete AC/ET/AC converter.

FIG. 15 is a schematic illustration of a three-phase application of quasi-direct AC/ET/AC conversion of equal amplitude according to the general description above. In particular, FIG. 15 shows:

the overall AC/AC conversion structure, referred to in this case as AC/ET/AC because the same DC link, namely the ET link, is shared by both of the ETAC conversions connected to the two AC networks ACNW1 and ACNW2;

the symmetrical envelope structure formed by double "E/2" units for each AC network; each E/2 unit corresponds structurally to one E/2 unit of FIG. 7;

the transition converter TS, of the multi-level cascade type, constructed with the sum in cascade of the voltage regulation in the range $V_T$ in series with which a unit "ET" is connected; this unit can regulate the width $V_{ET}$ of the overlap range ETr, expressed by the voltage "$\pm\frac{1}{2}V_{ET}$";

double homopolar conversion, if required, for regulating the neutral current of the two networks ACNW1 and ACNW2, with respect to the common midpoint M and having a common supply, called "$\pm\frac{1}{4}\hat{V}_{fN}$", where $\hat{V}_{fN}$ is the maximum amplitude of the phase to neutral components of both networks.

To sum up, the principle of quasi-direct AC/ET/AC conversion between AC networks of equal amplitude is manifested in the considerable simplification of a common DC link, called an ET link in this case, for both ETAC conversions, and in a specific application of the general principle of ET division of non-symmetrical AC networks and of the corresponding principle of ET overlap of the envelope and transition regulation ranges.

Multi-Level and PWM Splitting of the Transition Regulation Range

In ETAC conversion it is recognized that the transition converter TS has a regulation range TR which is much wider than the range ER known as the envelope range. Consequently, as a specific application of the general principle of cost and efficiency, in high voltage applications the transition converter TS alone may need to benefit from the multi-level splitting of its regulation range. In particular, in ETAC conversion it is possible and useful to split the regulation range TR so as to constantly assign the task of PWM regulation to a single conversion stage.

In the quasi-direct AC/ET/AC conversion of FIG. 15, the range ETR ($V_{ET}$) in overlap is assigned to a dedicated converter with a cascade structure, which is therefore a low-voltage type which is more suitable for PWM regulation. In the case of FIG. 15, however, the unit "T" must provide PWM regulation in the range TR ($V_T$), with only marginal assistance from the unit "ET" connected in cascade with it.

Figure 16:
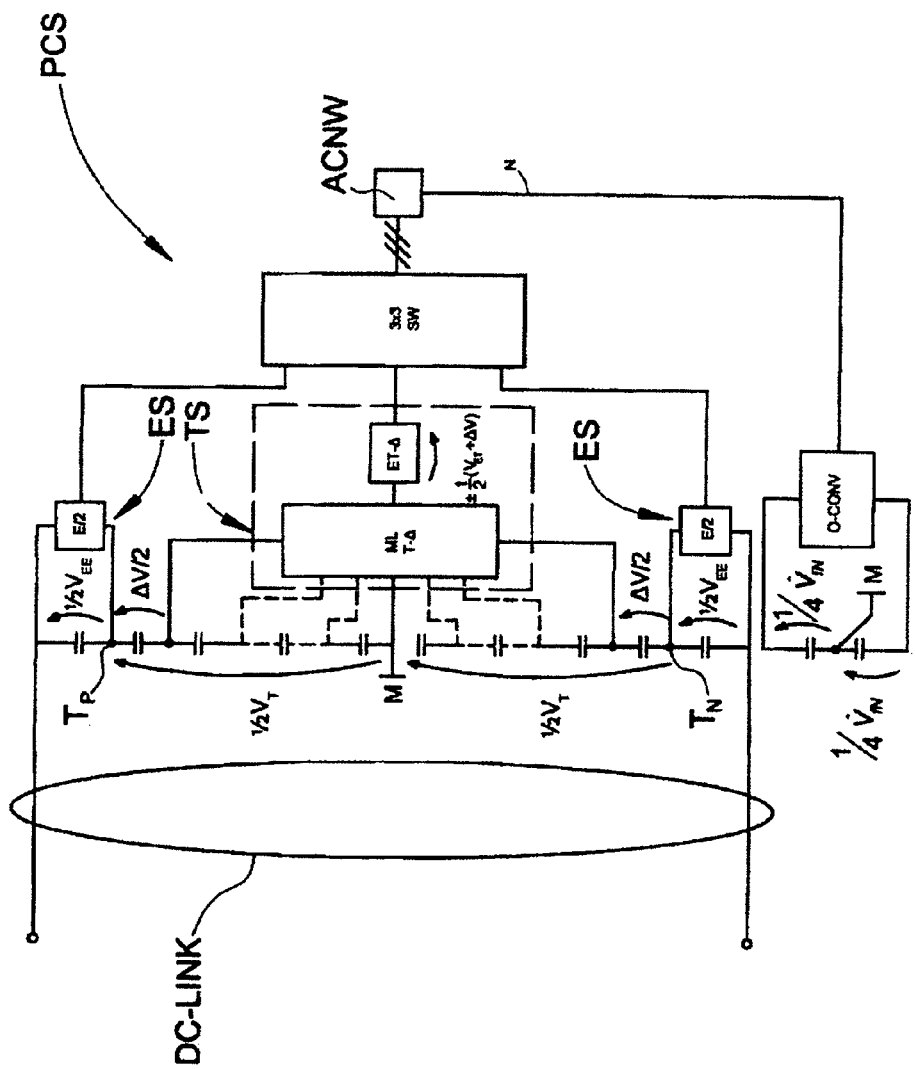
FIG. 16 is a diagram of an ET/AC converter with a transition converter comprising a level switch.

The same configuration using a common DC link (ET link), which is very convenient for the simplification of a multi-level structure, can be retained by using the generalized transition splitting proposed in FIG. 16, as part of a complete ET conversion structure which is symmetrical about the midpoint M.

The general concept of the splitting of the transition range means that (FIG. 16):

the regulation range with a width $\Delta V$ is extended to an incremental cascade-connected ET overlap converter (such as that of FIG. 15), making a total of $[\pm\frac{1}{2}(V_{ET}+\Delta V)]$;

the resulting cascade converter, called "ET+$\Delta$", can be used as a single PWM converter if said extension $\Delta V$ of the regulation range corresponds to the splitting of the transition range;

in this case the transition converter becomes a simple level switch (ML T–$\Delta$).

Because of the contribution $[\pm\frac{1}{2}(V_{ET}+\Delta V)]$ of PWM regulation of the cascade unit "ET+$\Delta$", at the transition level switch "MLT–$\Delta$" the width of the range $V_T$ is suitably reduced by two quantities ½$\Delta V$ towards both ends of the range $V_T$. The residual range "$V_T$–2(½$\Delta V$)" is therefore correctly split into "NL" different levels, where NL is the number (a positive integer) of capacitors between which the voltage $V_T - \Delta V$ is distributed, and therefore:

$$V_T = (1+NL)\Delta V \qquad 5$$

In the special and non-exclusive case of FIG. 16, NL is also an even number, such that the midpoint M is made to coincide with one of the levels available to the level switch "MLT-Δ".

In any case, the interesting property arises from the fact that the incremental ET overlap regulation range $V_{ET}$ also becomes available to assist the individual level switching operations executed by the multi-level transition switch "MLT-Δ", for example by reducing the current conducted in the switching time intervals to suitable values for switching, and even cancelling this current if necessary, in order to enable simple thyristors to be used.

Realistically, however, it will be necessary to implement suitable relationships between the switching times of the switches and the PWM period in order to achieve the theoretically desirable results.

FC-Less (Flying Capacitor-Less) Conversion

One of the more interesting aspects of the multi-level performance in ET conversion arises from the simplification of the independent capacitor banks required. In particular, it appears to be very useful to be able to provide the multi-level performance without the need for banks of "flying capacitors" (FC), which generally constrain the prior art multi-level structures, especially since they require transformer-based power supply systems for high frequencies, including reversible and regenerative systems.

A specific application of the general principle of multi-level and PWM splitting of the transition regulation range resolves the problem in a radical way by using such high-frequency transformers directly for the construction of the cascade-connected unit such as the unit "ET+Δ" of FIG. 16.

Additionally, the flow design of these transformers for the units "ET+Δ" benefits from the specific waveform of the transition voltage, of the quasi-triangular type at a frequency which is a multiple of the frequency of the network magnitudes.

Figure 17:
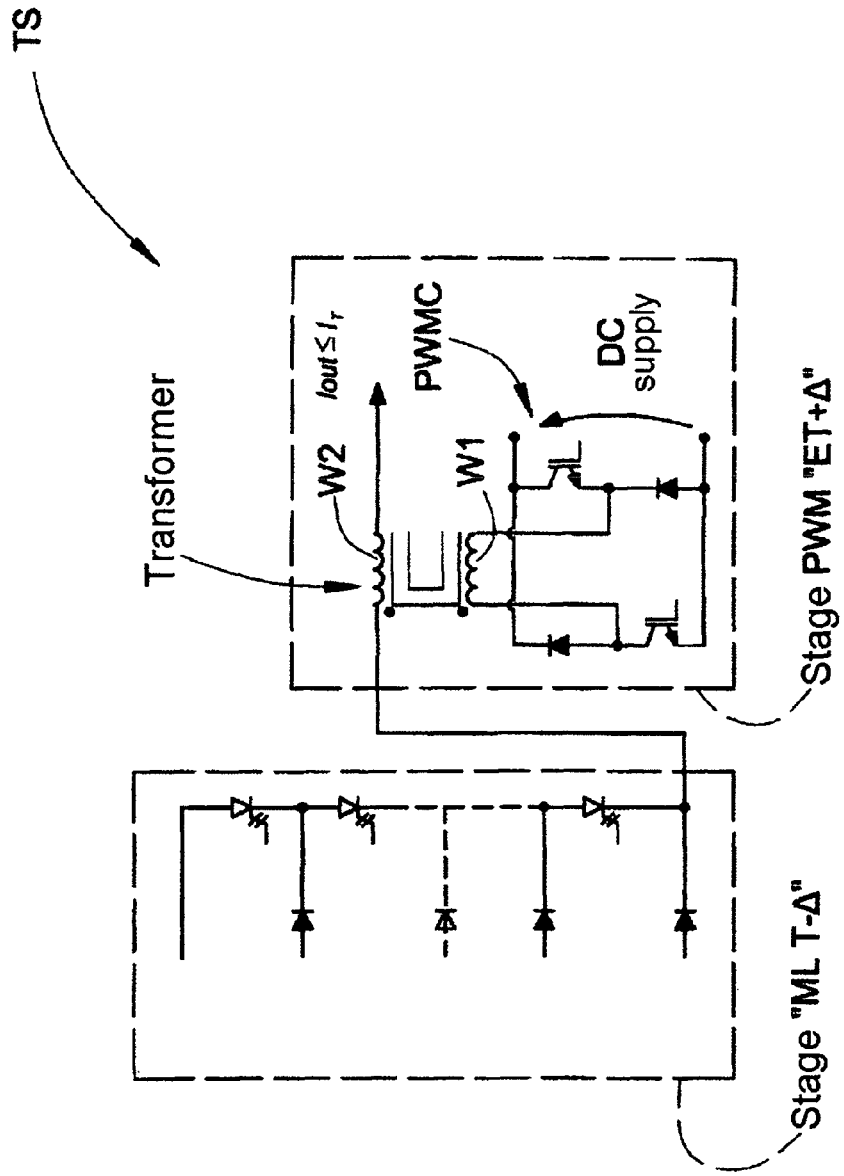
FIG. 17 is an elementary diagram with a single transformer for providing entirely "FC-less" conversion.

FIG. 17 shows an embodiment of the principle of FC-less conversion which is elementary rather than general in nature:

a simple secondary winding W2 of a transformer TRASF is connected in cascade with a thyristor level switch (MLT-Δ), to provide PWM regulation in a symmetrical range of values of the type $[\pm\frac{1}{2}(V_{ET}+\Delta V)]$;

a circuit PWMC for PWM regulation with an H bridge structure provides a symmetrical voltage supply to the primary winding W1 of this transformer, and this circuit can therefore be supplied with a continuous voltage ("DC supply") which is available, for example one of the voltages provided by the multi-level splitting which has already been arranged;

in the specific case of FIG. 17, the level switch (ML T-Δ) is of the unidirectional type, by application of the principle of division and unidirectional modularity of the transition; therefore the sign of the current in the secondary winding is defined in the same way as that of the current in the primary winding, except as regards the contribution of the magnetizing current, as a result of which the H bridge circuit PWMC is unidirectional and the typical short-circuit of the inverter leg is not possible.

Clearly, the practical embodiments can benefit in many ways from the principle of FC-less conversion. For example, it is possible:

to use a single voltage supply (DC supply in FIG. 17) for all the conversion stages associated with the primary windings of the transformers involved in the complete FC-less ETAC conversion;

to split the converter stage "ET+Δ" into multiple converters and transformers of lower power, with the possibility of supplying in parallel the converters connected to the primary windings and connecting all the secondary windings in series, thus increasing the resolution of the PWM;

using the transformers in bidirectional mode when it is not necessary or useful to apply the principle of unidirectional modularity of the transition, by completing the H bridge circuit or making it fully switchable for bidirectionality.

Figure 18:
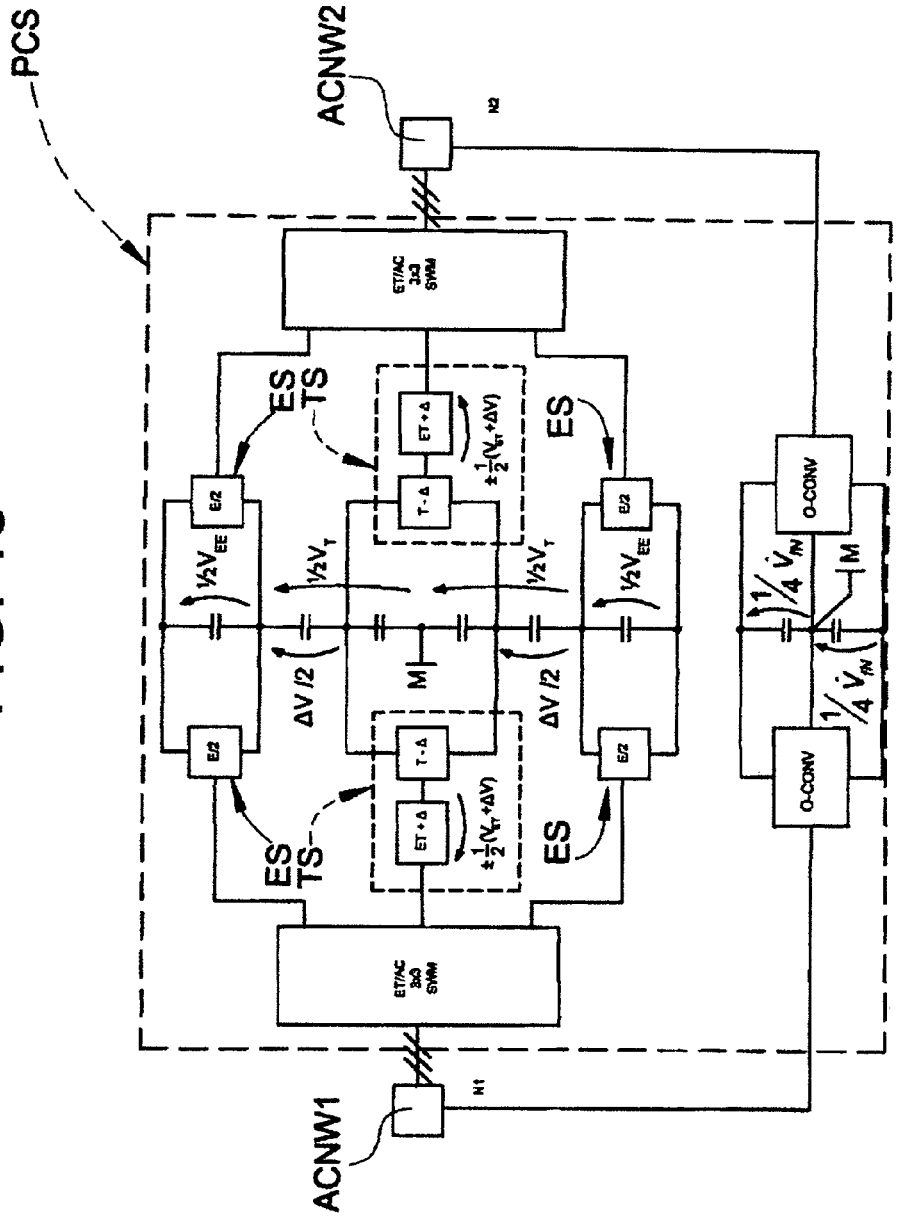
FIG. 18 is a diagram of a multi-level transition AC/ET/AC converter with minimal splitting.

Specific and Elementary Designs for Quasi-Direct "Multi-Level FC-Less" AC/ET/AC Conversion The specific case shown in FIG. 18, of a simple type, provides many characteristic properties of considerable practical usefulness. This is because the multi-level splitting is carried out with the minimum value NL=1 of the splitting compatible with the general principle of multi-level+PWM transition conversion, and therefore $V_T = 2 \Delta V$.

In this case, each multi-level selector, such as the selector "MLT-Δ" in FIGS. 16 and 17, is reduced to a single unidirectional cell, or a single inverter leg in the bidirectional case, designed for a voltage which is one half of the voltage $V_T$;

the transformer for the PWM conversion in cascade is optimally exploited in terms of flow, because of the particular waveform of the transition component.

It will be recalled that $V_T$ is 3/2 times the amplitude $\hat{V}_{fN}$ of the three-phase phase to neutral components, and therefore the components of "MLT-Δ" are designed for 3/4 of the amplitude $\hat{V}_{fN}$.

The maximum flow design at the secondary winding of a single transformer, as in FIG. 17, provides for the integral of a pseudo-triangular mean voltage with characteristic half-wave periods of 1/24 of the electrical period, and with a flow value which is less than 1/20 of the flow of an AC network transformer connected between a phase and neutral.

Clearly, the dimensions and cost of such transformers can be reduced further as NL increases.

Current Modularity and Functional Redundancy

A notable property of ET/AC conversion arises from the implicit possibility of providing the AC magnitudes in modular mode for each of the envelope and transition components.

This property is of considerable practical usefulness for high power or current converters, and ET conversion benefits from it in a particular way by establishing simple functional redundancy which also provides:

continuity of service if individual modules fail, without modification of the structure and overall performance, except as regards the reduction of the availability of maximum current;

the possibility of regulating the amplitude of the AC voltage down to zero, for current contributions, by the different modules of the transition conversion system distributed suitably between the different AC phases;

the same regulation of the amplitude of the AC voltage down to zero, practically at the full current available at full voltage, by application of the concept of unidirectional modularity of transition with a suitable number of unidirectional modules.

Each of the envelope and transition current components can be converted by the same DC link or ET link, as the sum of any number of typically equal parts, converted by modules designed for this current fraction, each switched in the AC network by dedicated thyristors or diodes of SWM or ET/AC arrays in the same multiplicity of individual modules. If a module fails, it can be isolated, by an active method and/or by fuses, either from the DC link or from the AC network, while keeping the properties of all the other modules unchanged.

A very simple example of current modularity is shown in FIG. 19, where all the conversion and switching devices are designed for a current having approximately half the amplitude of the AC line currents.

Specialization of ET Converters with the Power Factor

By applying the principle of ET division it is possible to reduce the cost of the semiconductor power components in many cases in which the specific features of the application are associated with constraints on the direction of the converted power and limits on the phase offset between voltage and current or on the power factor.

The simplest example, which is of considerable practical usefulness, is that of an AC/DC supply from a three-phase network, replacing simple diode rectifiers in order to achieve sinusoidal current absorption. In this case, characterized by a unitary power factor, the transition current component is composed of curves of the sinusoid in phase with the transition voltage, the maximum value of which is half of the amplitude of the line currents of the AC network.

Consequently, with reference to FIG. 19 (system PCS1), it will be seen that the transition conversion system TS is conveniently formed by two separate unidirectional conversion sub-systems TUP and TUN, designed for a maximum current equal to one half of the amplitude $\hat{I}$ of the line currents, having different regulation ranges for the two current signs, each having a width of approximately half of the total width of the transition voltage component.

The input stage PCS 1 in FIG. 19 is drawn in a simplified way to show these properties of design in respect of current and regulation range.

FIG. 19 shows, in particular,
the symmetrical structure about the midpoint M;
the unidirectional envelope converters ES and the reduction of the envelope switches to simple rectifier diodes for the converter PCS1 and to simple controlled diodes for PCS2;
the design of ES which is divided into two unidirectional modules $EU_i$, $EU_o$ for each envelope;
the division of the transition system TS into two unidirectional converters TUP and TUN in PCS1 and twice that number in PCS2;
the related division of the switch array SWM into double unidirectional transition and envelope connections for PCS2;
the design of all the power components for a current of approximately half of the amplitude $\hat{I}$ of AC current.

In practice, the input stage PCS1 of FIG. 19 appears simplified, especially in the absence of the overlap range ET, which can dominate the switching of the thyristors of the array, but the individual units TUP and TUN can comprise any type of arrangement and structure dedicated to the transition.

The output stage PCS2 is compatible with the input stage in respect of the direction of the power and therefore of the currents. However, in order to simplify the envelope part of the array by using simple thyristors without diodes in anti-parallel, it is necessary to assume a current offset within a range of ±30 degrees, in other words $|\cos \phi| > 0.866$, as indicated in FIG. 19. The same assumption of the range of values of $\cos \phi$ also implies:

the extension of the voltage regulation range to the whole transition range for the unidirectional transition converters TUP and TUN also;
the possibility of regulating the maximum transition current so that it is equal to the amplitude of the AC line components, exactly as for the envelope converters.

In conclusion, the specified variability of $|\cos \phi|$ does not provide any benefit in respect of the dimensions of the envelope and transition converters, but it enables the envelope switches of the array to be simplified.

FIG. 19 shows the example of AC/ET/AC conversion between two three-phase networks ACNW1 and ACNW2 of equal or similar amplitude, characterized in particular by:
absorption at $\cos \phi = 1$ from the input network;
supply of power at $|\cos \phi| > 0.866$ into the output network;
current modularity of all the conversion modules, equal to approximately half of the amplitude of the line currents; consequently, the transition modules TUP and TUN connected to the output are provided in twice the number of those connected to the input;
transition voltage regulation ranges specialized as a function of the corresponding $\cos \phi$.

Common DC Supply Voltage for all the PWM Converters (Common DC PWM FC-Less)

One of the problems of multi-level conversion is the partial use, which is discontinuous in some areas, of the voltage supply units with their banks of source filter capacitors required for the generation of the multilevel potentials. The result is always a considerable overdimensioning of the supply units and/or the capacitors with respect to what would be sufficient with a greater degree of simultaneity of use of a single DC source supplying a plurality of converters simultaneously.

ET conversion makes it possible to use a single DC link, split into ranges which depend on the specific application of the ET division, which in itself simplifies the regulation of the load distribution and the corresponding dimensions of the auxiliary conversion means. However, it should also be noted that the voltage sources for supplying PWM converters must be regulated and protected according to more restrictive criteria than those which are suitable or sufficient in the generation of voltages switched by a plurality of simple switches, such as natural switching or controlled turn-off thyristors.

To sum up, in order to achieve a simpler and more efficient mode of reliable operation and corresponding failure-mode analysis, it would ideally be preferable to have a voltage source, or no more than two sources, for the supply of all the PWM converters, which would therefore be constructed by the same technology, and would be equipotential to each other for further savings in respect of insulated mounting, cooling, driving and control.

This can be achieved in ET conversion by a specific application of the general principle of what is known as FC-less multi-level transition conversion, in other words conversion using transformer-based cascaded PWM regulation, as for the single generic unidirectional module of FIG. 17, if the PWM converters on the primary winding of the transformers used are all supplied at the supply voltage of the converter or of the envelope conversion system. For example, non-symmetrical ET conversion provides a single voltage which defines the envelope regulation range, whereas not more than two different voltages are provided in symmetrical structures, at the opposite ends of the DC link, known as the ET link.

Figure 20:
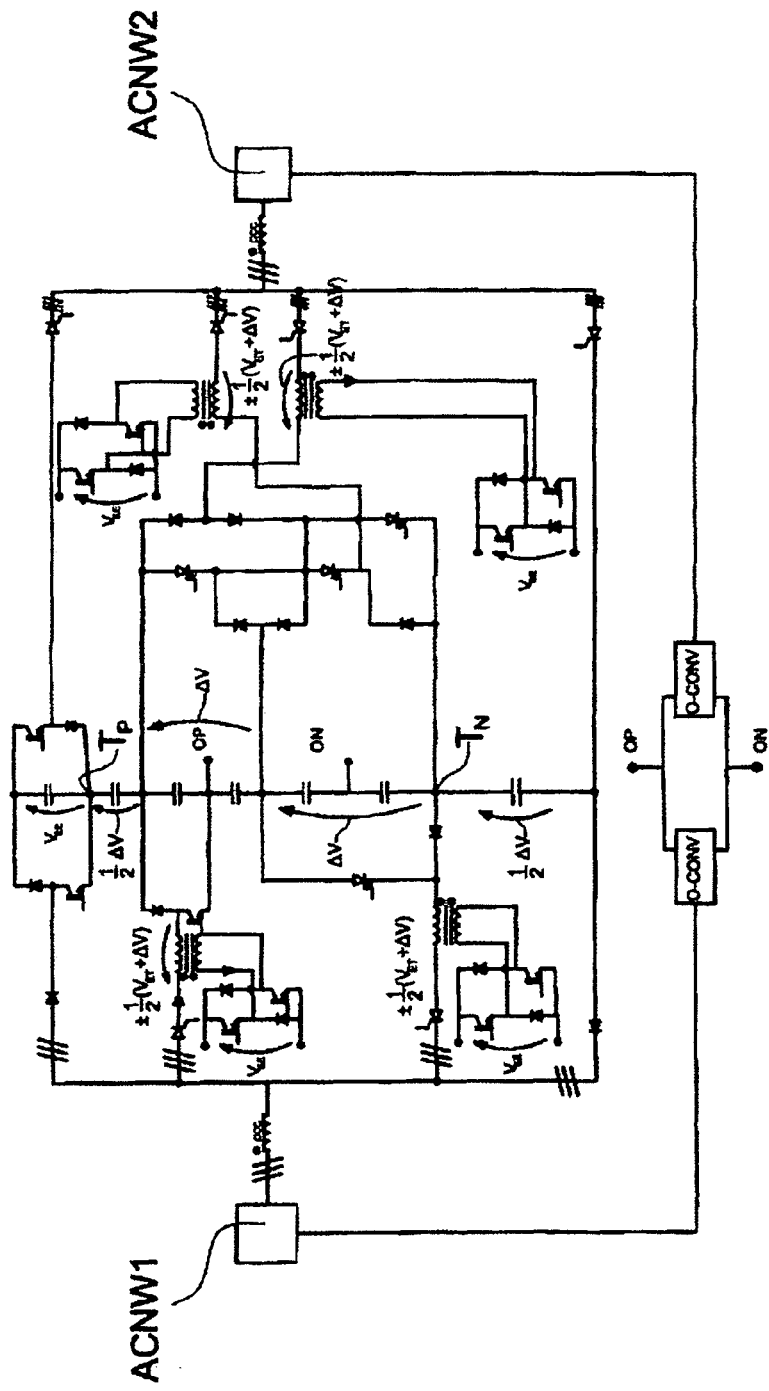
FIG. 20 shows an AC/ET/AC conversion system without flying capacitors and with homopolar conversion, with a DC link divided into seven levels.

FIG. 20 shows an application of this principle, in which the PWM converters on the primary are four different devices because they are all unidirectional towards both AC networks ACNW1 and ACNW2. The voltage $V_{EE}$, dedicated to the systems of PWM conversion of the envelopes of both of the converted AC networks, is made available to all the PWM converters which regulate the sum of the voltages. Consequently the voltage $V_{EE}$ has the highest degree of simultaneity of supply with respect to the PWM converters, and the corresponding filter capacitors benefit from this.

Full Equally Distributed DC Link Conversion of the Common DC PWM FC-Less AC/ET/AC Type The regular splitting of the voltage in the DC link, in other words its splitting into voltages which are all equal or nominally equal, can be very useful in making it possible to use only one type of capacitor, and to simplify the load balancing by regulation of the corresponding voltages.

FIG. 20 shows the case of optimal use of equal distribution in three-phase ET division for two AC networks having AC voltages of equal amplitude, requiring the use of a sufficient and necessary number of homopolar converters for the supply.

The minimum number required for this equally distributed split is seven, because of the choice of a non-symmetrical structure; otherwise this minimum number would be doubled. The width of the envelope regulation range, equal to approximately $1/7.5$ of the envelope amplitude of a single sinusoidal three-phase network, is increased to $1/7$ for better coverage of both envelopes of the two AC networks. The remaining $6/7$ represents the transition conversion base, to which the cascaded overlap range must be added. The cascaded contribution is also extended to the term $\pm 1/2 \Delta V$ which completes the capacity of PWM regulation in cascade in application of the FC-less principle; clearly, $1/2 \Delta V$ is made equal to $1/7$ of the envelope amplitude, in other words $1/6 V_T$, for the correct equal distribution of the DC link, which is better defined as an "equally distributed ET link".

With reference to the waveforms of FIG. 4, particularly the homopolar voltage $V_{N,EN}$ between the neutral and the negative envelope, the splitting of the transition range into six equal parts is noteworthy because it makes available at the terminals OP, ON the potentials at $1/3$ and $2/3$ of the transition range, which are necessary and sufficient for the supply of the two homopolar converters O-CONV. The structure is non-symmetrical overall, as required by the waveforms of FIG. 4. These are shown with reference to the negative envelope potential, which is used as the "constant" (i.e. unregulated) envelope terminal, while the positive terminal must be regulated over the whole envelope regulation range $V_{EE}$, placed at the positive end of the ET link.

FIG. 20 shows an example of a non-symmetrical conversion structure, specialized for cos φ=1 at the input and |cos φ|>0.866 at the output, for clearer comparison with the symmetrical case of FIG. 19, defined for the same specification in terms of power factors. In this case, since equal distribution of the DC link is used, the input side transition conversion, which benefits from cos φ=1, is distinctively non-symmetrical in application of the cost reduction by specialization into two unidirectional converters, which benefit in two different ways from the reduction of the corresponding voltage regulation ranges. This is demonstrated by the two different level switches: the switching of $1/6 V_T$ is sufficient for the incoming current, but twice this amount is required for the outgoing current.

Incorporation of the ET Overlap Range into PWM Switch Drivers for Transition Converters The principle of ET overlap of the envelope and transition ranges can be applied in a particularly simple and economical way when the necessary voltage, called $V_{ET}$, is equal or similar to the supply voltage of the drivers of the transistors used for the PWM regulation of the transition component.

The voltage $V_{ET}$ defines the range which can be regulated in overlap for contiguous envelope and transition ranges. In application of the criterion of cost and efficiency, this range is added to the transition range, and therefore the regulation in overlap is provided by the transition converter in the envelope regulation range.

This can be provided in a useful way, for example in ET/AC conversion to a single AC network, for which the ET overlap range is designed for the control of the derivative of current in the natural switching thyristors used in the array SWM (ET/AC), of a type with or without integrated snubber capacitors. In this case, the triggering of the transition thyristors must be "advanced", to allow the "natural" switch-off of the envelope thyristors, controlled by the envelope conversion system in its regulation range. In other words, to achieve continuity of the AC current regulation, at least one transition converter must be able to regulate the current "in advance" to permit the advanced switch-off of an envelope current and consequently the natural switching of the thyristor which conducts it in the ET/AC array.

Figure 21:
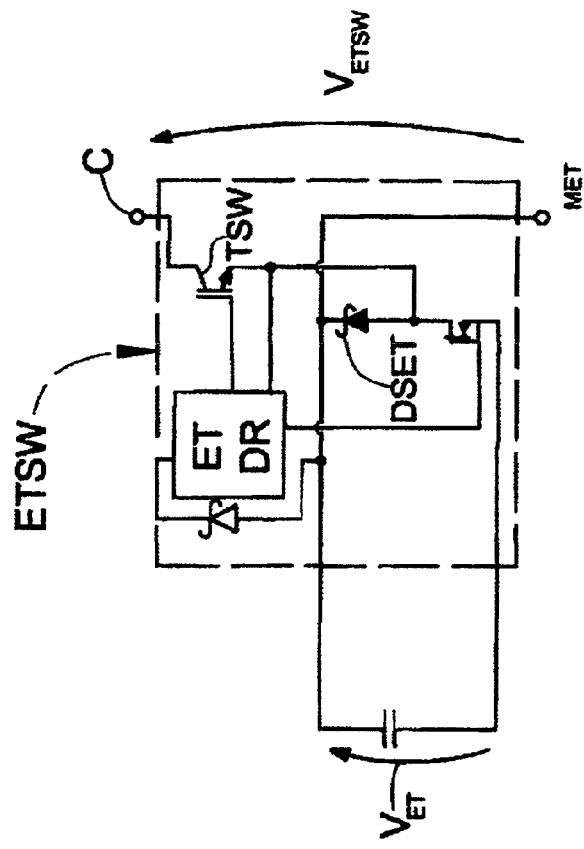
FIG. 21 shows the circuit of a multi-level forced switching device.

The low voltage $V_{ET}$ provided by the ETSW circuit is sufficient in some special cases, typically when a PWM transition conversion at very high frequency is used in a conversion to an AC network whose frequency is low or much lower than the PWM frequency. Evidently, this possibility is also available in applications using low AC voltage, including domestic and some industrial applications. FIG. 21 therefore shows an example of an ETSW circuit constructed with an IGBT transistor, typical of industrial applications, to which is added a typical cell composed of a MOSFET and Schottky diode DSET at very low voltage, typically <30 V, capable of switching the voltage $V_{ET}$ from which it is easy to take the supply for the driver circuit "ETDR". The functional description reveals the three useful states of the voltage $V_{ETSW}$ which can be generated across the terminals of the ETSW circuit, between the collector C of the IGBT and the terminal called MET:

the IGBT is the main transition power transistor; in its OFF state, the voltage $V_{ETSW}$ is high and is produced by the conduction of the recirculation diode of the transition cell to which the IGBT belongs (not shown in FIG. 21); when the IGBT is OFF, the MOSFET can be freely switched to generate pulses for the regulated supply of the driver ETDR;

the IGBT acts as a short circuit when it is ON (with a voltage of approximately zero) to increase the transition current which it regulates, if the MOSFET is OFF, the voltage drop of the Schottky diode DSET being added to that of the IGBT; this combination is used for normal regulation in the transition range defined as $V_T$;

the IGBT and the MOSFET are ON simultaneously to set the voltage $V_{ET}$ in the circuit, thus setting $V_{ETSW} = -V_{ET}$ (disregarding the voltage drops in conduction), thus bringing the transition regulation into the envelope range;

the IGBT is therefore permanently ON to provide the ET overlap range, and the PWM regulation of the transition current is provided by the cell (MOSFET and Schottky diode DSET);

in particular, it is possible to activate a transition thyristor in a way which is complementary to the "advanced" switch-off of an envelope thyristor, controlled by the envelope regulation system.

DC/ET Conversion and a Simple Example in a Single-Phase Inverter with Unitary Power Factor ET conversion, designed for AC networks, imposes specific requirements for DC/DC conversion in the construction of DC/AC converters, commonly called inverters. This is because the DC links for supplying the voltages required for ET conversion, called ET links because they define the ET regulation ranges, have to be supplied in a different way for each capacitor of the ET link, which is suitably adapted to form a filter and an energy store capable of making the conversions between the different converted networks independent of each other.

However, this requirement does not make it necessary to provide multiple DC/DC regulation converters, one for each voltage of the capacitors. In fact, one of the properties of an ET link is that its filter capacitors have a common connection, thus facilitating the construction of integrated DC/DC conversion structures for the ET link, these structures therefore being called DC/ET conversion structures.

The DC/ET conversion structures of practical interest are defined by the characteristics of the DC energy sources, which typically have the properties of real voltage generators. Therefore, a suitable DC/ET converter, of any type (step-down, step-up, etc.), initially regulates a whole inductive state variable, in other words the current in an inductance, to regulate the converted DC power. Now, this inductive current can be "distributed" in PWM between the different terminals of the ET link, with structures conveniently integrated to enable their multi-level properties to be used.

FIG. 22 shows the simplest case of DC/ET regulation of the step-up type, which is of greater practical interest but is less intuitive than step-down regulation. The converter is a single-phase generation converter in a low or industrial voltage AC network, such that the ET link defines the ET regulation ranges, as in FIG. 2 for example, with the remarkable property of two voltages which have a common terminal, called MET, and which are very different from each, since $V_T \gg V_E$. The DC/ET converter is therefore conveniently formed by two unidirectional typical cells which are entirely differentiated as regards their design voltage, but which operate jointly and in synchronous mode:

the "IGBT+diode U" cell, which is designed for the total voltage, being arranged as for a common step-up voltage conversion from the DC at the common terminal on the positive end of the DC link; the diode U is of the PWM, or "ultrafast", type;

a PWM current distribution cell, DCELL.

The step-up current output is available in FIG. 22 in the form of current in the anode of the diode U, at the point ED of DCELL, and is not dedicated to a single terminal, but can be "distributed" between the other terminals of the ET link, which in the present case are those of the $V_E$ filter capacitors.

The current "distributor" is the unidirectional cell "DCELL", designed for a very low voltage, equal to the width $V_E$ of the higher or envelope regulation range.

The optimal operation of the DC/ET step-up conversion conveniently comprises three stages in each PWM period:

IGBT ON: to store energy in the inductance, thus increasing its current; in this stage, no current is available towards the ET link, and the MOSFET can be in any state; however, the opening of the IGBT (turn-off) conveniently takes place at minimum voltage, in other words with the MOSFET ON; the next stage will therefore be IGBT OFF and MOSFET ON;

IGBT OFF and MOSFET ON: in this stage, the inductive current is supplied on the intermediate terminal of the ET link, denoted MET; the current and the energy in the inductance can increase or decrease according to the sign of the voltage difference ($V_T$–$V_{DC}$); when the load supplied on this terminal is at the necessary level, the MOSFET must be opened;

IGBT and MOSFET both OFF: in this stage, the inductive current is supplied on the end terminal of the ET link, which is the negative terminal in FIG. 22; the energy in the inductance will therefore necessarily decrease; a return must then be made to the first stage by closing the IGBT, although it is much more efficient to close the MOSFET slightly in advance, so as to make the IGBT turn ON at the minimum voltage $V_T$, instead of at the maximum voltage ($V_T + V_E$).

This sequence defines the convenient phase synchronization of the switching of the various typical cells used for a step-up DC/ET conversion. The same principle can be applied, for example, to a symmetrical envelope conversion system, simply by doubling the "distribution" cells for users at opposite ends of the ET link, in a similar way to the arrangement shown in FIG. 14 using the bidirectional cells 1 and 2.

The case of step-down conversion is even simpler and has more degrees of freedom. In this case, the MOSFET "distributor" on the terminals of $V_E$ could act continuously to distribute the inductive current regulated by a step-down DC/DC converter. Consequently this case will not be described further.

It should be noted that DC/ET structures use the components which are also used in ET/AC conversion, with dimensions suitable for the same regulation ranges, as shown in FIG. 22, use the circuit of FIG. 21 for the unit "ETSW" which can regulate the transition and the switching of the thyristors with overlapping ET regulation ranges.

With reference to FIG. 22, it should be noted that all the regulation properties can again be obtained in a circuit for direct DC/ET/AC conversion, which can be produced by connecting the common terminals of the MOSFET envelope cells, indicated by ED and EI in FIG. 22. In reality, this direct conversion imposes significant constraints of dimensions and functionality when used to supply a single-phase network, but would be optimal when used to supply a three-phase network. This comment serves to reveal the compatibility and technological homogeneity of DC/ET and ET/AC conversions, in other words the convenience of the integration of DC/AC conversion as DC/ET/AC conversion which may be direct or quasi-direct according to secondary cost factors.

Naturally, the principle of the invention remaining the same, the forms of embodiment and the details of construction may be varied widely with respect to those described and illustrated, which have been given purely by way of non-limiting example, without thereby departing from the scope of the invention as defined in the attached claims.

The invention claimed is:

1. Method for the regulation of power in an alternating current electrical network (ACNW; ACNW1, ACNW2), using a conversion system (PCS) having at least two terminals (1,2; 1,2,3; 1,2,3,N) for connection to the network, wherein each of said terminals has a corresponding electrical potential; each of the potentials of said terminals has an upper and a lower envelope, the difference between which, or envelope voltage ($V_{EP,EN}$) is a variable positive continuous quantity, having a maximum value ($V_{EA}$) called the envelope amplitude;

the method comprising the operations of:
defining at least an upper range (ER) of voltage values, comprising said maximum value or envelope amplitude ($V_{EA}$) and having a width ($V_E$; $V_{EE}$) which is substantially smaller than the envelope amplitude ($V_{EA}$);
using said conversion system (PCS) including at least a first static converter (ES) capable of regulating the electrical power by the regulation of said width ($V_E$; $V_{EE}$) in the aforesaid upper range (ER);

said upper range (ER) having said width determined in such a way that said at least one static converter (ES) regulates more than one half of the mean active electrical power exchanged with the network (ACNW; ACNW1, ACNW2) wherein at least a second static converter system (TS) is used to regulate the electrical power in a lower range (TR) of voltage values, known as the transition range.

2. Method according to claim 1, wherein the network (ACNW; ACNW1, ACNW2) is a multiphase alternating network and said at least one converter (ES) is coupled to the network through at least three connection terminals (1, 2, 3; 1, 2, 3, N), and wherein the aforesaid envelope voltage ($V_{EP}$, $E_N$) varies in an interval of values ($V_T$ to $V_{EA}$) lying between a maximum value ($V_{EA}$) and a minimum value ($V_T$), and the static converter (ES) is used to regulate the electrical power by regulation of the envelope voltage ($V_{EP,EN}$) in said range (ER), which includes said interval ($V_T$ to $V_{EA}$).

3. Method according to claim 2, wherein said range (ER) substantially coincides with said interval ($V_T$ to $V_{EA}$).

4. Method according to claim 1, wherein said transition range (TR) has a width ($V_T$+$V_{ET}$) such that it partially overlaps said upper range (ER).

5. Method according to claim 4, for a multiphase network (ACNW; ACNW1, ACNW2), wherein the outputs of the envelope conversion system (ES) are coupled to means for the passive or regulated generation of continuous voltages which are greater than the positive potential and less than the negative potential of the envelope voltage ($V_{EP,EN}$) these means being usable in the transition conversion system (TS) for regulation in the range (ETR) of overlap between the transition range (TR) and said upper range (ER).

6. Method according to claim 1, wherein use is made of a multi-level DC link having two terminals (TP, TN) between which there is a voltage ($V_T$) corresponding to the difference between the voltage ($V_T$+$V_E$; $V_T$+$V_{EE}$) between the end terminals of said DC link and the width ($V_E$; $V_{EE}$) of the regulation range (ER) of the first static conversion system (ES), said voltage ($V_T$) being divided into NL intermediate fractional voltages ($\Delta V$), where NL is any integer, and into two extreme fractional voltages each having a value (½ $\Delta V$) equal to half of the value ($\Delta V$) of the intermediate fractional voltages, and wherein the aforesaid second static conversion system (TS) comprises a multi-level voltage switch (ML T–$\Delta$) to the input of which said intermediate fractional voltages are applied, and to the output of which a PWM conversion system (ET+$\Delta$) is connected in cascade.

7. Method according to claim 6, wherein the PWM conversion system (ET+$\Delta$) comprises at least one transformer (TRASF) with a primary winding (W1) coupled to the output of a corresponding PWM converter circuit (PWMC) and with a secondary winding (W2) connected in cascade to the output of the multi-level voltage switch (ML T–$\Delta$).

8. Method according to claim 6, for power conversion between a first (ACNW1) and a second (ACNW2) three-phase AC network, wherein the number NL of the aforesaid intermediate fractional voltages is equal to 2, and each intermediate fractional voltage is in turn split into two voltages (½ $\Delta V$) which are equal to each other, and wherein a single envelope conversion range (ER) is defined with a width ($V_E$; $V_{EE}$) substantially equal to one half of the value of each of said intermediate fractional voltages;

the resulting split of the voltage between the aforesaid terminals ($T_P$, $T_N$) being such that intermediate terminals are available (OP, ON) and have potentials suitable for the supply of a homopolar conversion system (O-CONV), if present, for regulating the currents of the neutral connections of said networks (ACNW1, ACNW2).

9. Method according to claim 1, wherein at least one of the connections between the network (ACNW; ACNW1, ACNW2) and the conversion system (PCS) is a neutral or homopolar connection (N); the method also comprising the use of at least one dedicated converter (O-CONV) adapted to regulate the electrical power in the network (ACNW; ACNW1, ACNW2) by controlling the current ($I_N$) in said neutral or homopolar connection (N).

10. Method according to claim 1, wherein use is made of a global conversion system (PCS) comprising at least one envelope conversion system (ES), at least one transition conversion system (TS) if required, and an array of controllably switchable connections (SWM) between the outputs of the conversion system or systems (ES, TS) and the terminals (1,2; 1,2,3) of the network (ACNW; ACNW1, ACNW2); the array (SWM) being characterized in that it comprises non-controllable diodes (D) and non-reversible switches (TNR) for all the connections to the terminals (EP,EN) between which the envelope voltage ($V_{EP,EN}$) is generated.

11. Method according to claim 10, wherein said array of connections (SWM) also comprises reversible switches (THR) and snubber capacitors (CSN) associated with said reversible switches (THR) and with the non-reversible switches (TNR).

12. Method according to claim 1, wherein use is made of a conversion system (PCS) that includes an envelope conversion system (ES) divided into a first and a second converter (E/2; $EU_i$, $EU_o$), supplied with respective nominally identical voltages which are equal to approximately half of the width ($V_E$; $V_{EE}$) of the aforesaid upper range (ER), generated at the opposite ends of a chain or series of continuous voltages, between which ends (TP, TN) a predetermined direct-current voltage ($V_T$) is generated.

13. Method according to claim 1, wherein use is made of at least one bidirectional transition conversion system (TS) formed by a pair of unidirectional current converters (TUP, TUN), which can be regulated in a mutually independent way, and an array (SWM) of switchable connections having at least one pair of corresponding inputs ($T_{in}$, $T_{out}$) of opposed directionality, each connected to the output of a corresponding unidirectional current converter (TUP, TUN).

14. Method according to claim 1, wherein use is made of an envelope conversion system (ES) to the output of which a transition conversion system (TS) is connected in cascade.

15. Method according to claim 14, for a multiphase network, wherein use is made of a transition conversion system (TS) which comprises a multiphase bridge converter controlled in PWM mode and having a plurality of outputs connected to the network, and an array (SWM) of controlled switch connections, connected to the output of the envelope conversion system (ES) and having a corresponding plurality of outputs connected to the outputs of the transition conversion system (TS) and to the network.

16. Method according to claim 14, for a multiphase network, wherein the transition conversion system (TS) is integrated with an array (SWM) of controlled switch connections, in a multiphase bridge structure having a plurality of outputs connected to the terminals of the network (ACNW), and wherein there is connected between each input terminal and each output terminal of the bridge structure a corresponding controlled switching unit including the parallel of at least one switch for carrying out PWM switching and of at least one controllable switch for switched conduction with the phases of the network.

17. Method according to claim 1, for power conversion between alternating current networks (ACNW1, ACNW2) with envelope voltages of substantially identical amplitudes, and in which use is made of an AC/AC conversion system (PCS) including at least a first and a second converter AC/DC (PCS1, PCS2) having their respective DC outputs sequentially interconnected.

18. Method according to claim 17, for power conversion between three-phase AC networks (ACNW1, ACNW2), wherein one (PCS1) of said AC/DC converters (PCS1, PCS2) is used to convert only the active power of constant sign from a first (ACNW1) of said networks to the other network (ACNW2), its envelope conversion system (ES) therefore comprising only unidirectional converters ($EU_i$; $EU_o$), and wherein its transition conversion system (TS) is divided into two unidirectional converters (TUP; TUN), each designed for a current of approximately one half of the amplitude of the AC line currents ($\hat{I}$) of said first network (ACNW1) and each having a voltage regulation range of approximately one half of the width ($V_T+V_{ET}$) of the aforesaid transition range (TR).

19. Method according to claim 1, wherein the second static conversion system (TS) makes use of forced switching devices (ETSW) each including a first and a second power or output terminal (C, MET) between which are connected in cascade a main switch or transition switch (TSW) and a typical PWM forced switching cell PWM including a transistor, preferably of the MOSFET type (MOSFET) and a diode, particularly a Schottky diode (DSET), and supplied with a voltage ($V_{ET}$) equal to the width of the overlapping regulation range (ETR), in such a way that, when the main switch (TSW) is open, there is an open circuit between the power terminals (C, MET), and, when the main switch (TSW) is closed, there is a short circuit or a voltage whose value corresponds to said supply voltage ($V_{ET}$) between said power terminals (C, MET).

20. Method according to claim 1, wherein the width ($V_E$; $V_{EE}$) of said upper range (ER) is regulated by at least one typical PWM forced switching cell (DCELL) adapted to divert at least an inductive current generated by a DC/DC converter (IGBT, U).

21. Static conversion system for the regulation of power in an alternating current electrical network, using a method according to claim 1.

* * * * *